US011843870B2

(12) United States Patent
Ozaki et al.

(10) Patent No.: US 11,843,870 B2
(45) Date of Patent: Dec. 12, 2023

(54) IMAGE PROCESSING APPARATUS, IMAGE PROCESSING METHOD, AND IMAGE CAPTURE APPARATUS

(71) Applicant: CANON KABUSHIKI KAISHA, Tokyo (JP)

(72) Inventors: Kaoru Ozaki, Tokyo (JP); Yusuke Horishita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 187 days.

(21) Appl. No.: 17/584,551

(22) Filed: Jan. 26, 2022

(65) Prior Publication Data

US 2022/0247915 A1 Aug. 4, 2022

(30) Foreign Application Priority Data

Feb. 4, 2021 (JP) .................................. 2021-016889

(51) Int. Cl.
*H04N 23/741* (2023.01)
*H04N 19/86* (2014.01)
*H04N 23/73* (2023.01)
*H04N 23/76* (2023.01)

(52) U.S. Cl.
CPC .......... *H04N 23/741* (2023.01); *H04N 19/86* (2014.11); *H04N 23/73* (2023.01); *H04N 23/76* (2023.01)

(58) Field of Classification Search
CPC .... H04N 5/2355; H04N 5/2353; H04N 5/243; H04N 19/86; H04N 5/35554
See application file for complete search history.

(56) References Cited

U.S. PATENT DOCUMENTS

2021/0203949 A1\* 7/2021 Horishita ............. H04N 19/182

FOREIGN PATENT DOCUMENTS

JP 2019-186910 A 10/2019

\* cited by examiner

*Primary Examiner* — Twyler L Haskins
*Assistant Examiner* — Angel L Garces-Rivera
(74) *Attorney, Agent, or Firm* — Carter, DeLuca & Farrell LLP

(57) ABSTRACT

An image processing apparatus obtains a plurality of pieces of image data with different exposure amounts and then performs a level-conversion of the image data by applying input/output characteristics thereto. The apparatus encodes the image data whose level has been converted and decodes the encoded image data. The apparatus further applies inverse characteristics of the input/output characteristics to the decoded image data and then generates combined image data. In generating the combined image, the input/output characteristics are set in accordance with a combining ratio of each of the image data.

17 Claims, 17 Drawing Sheets

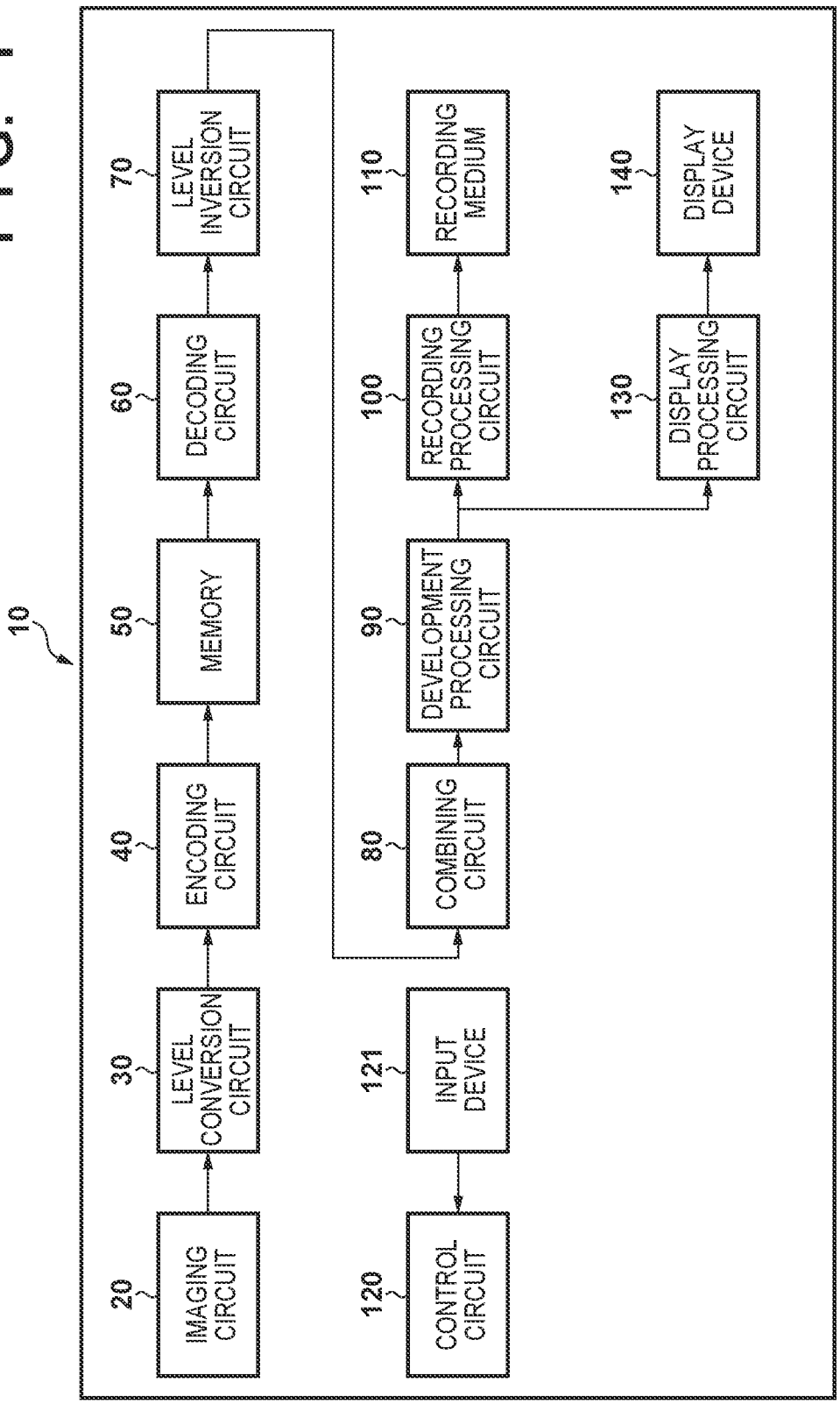

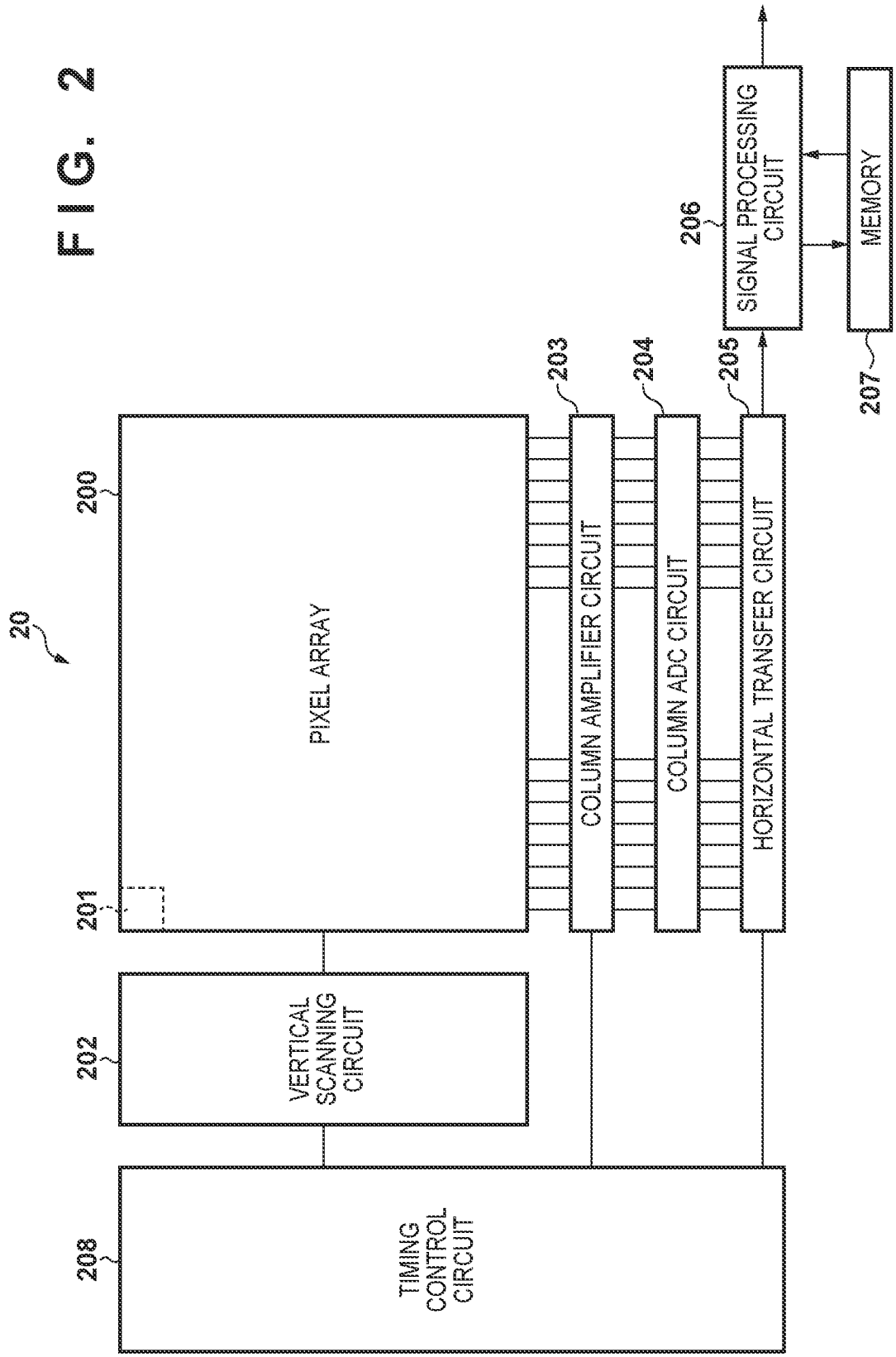

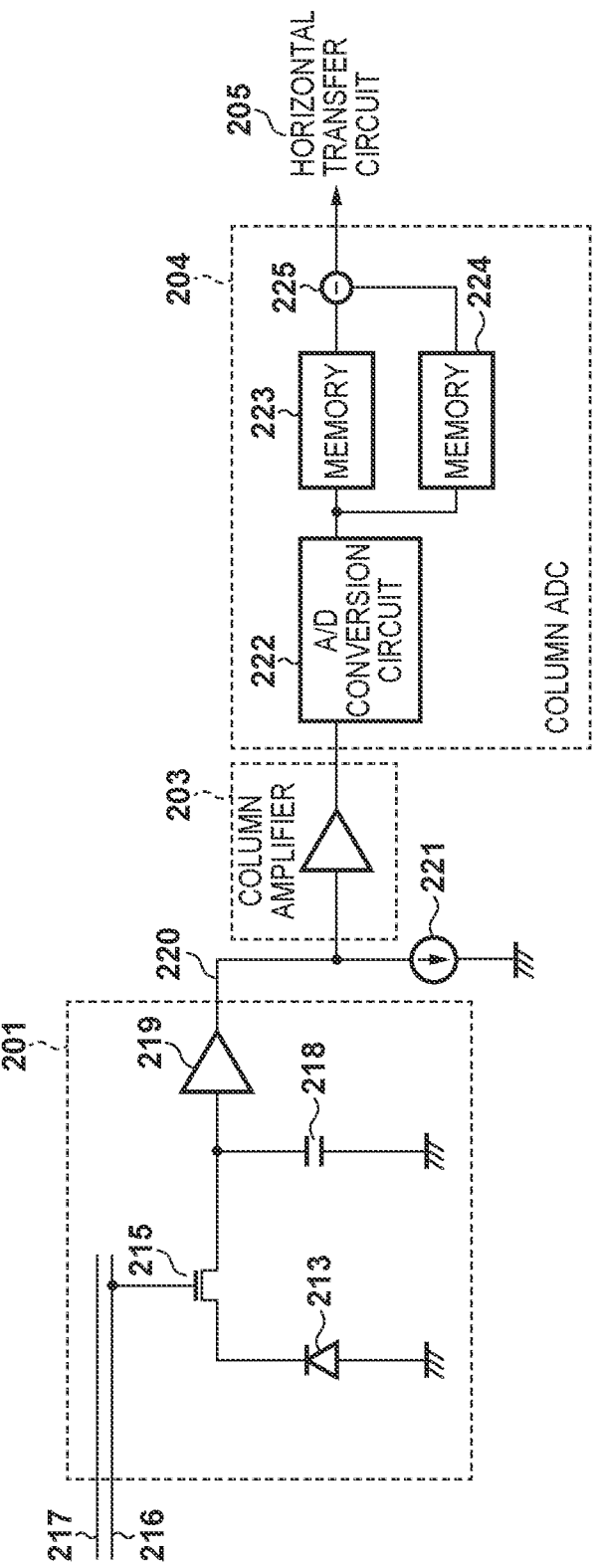

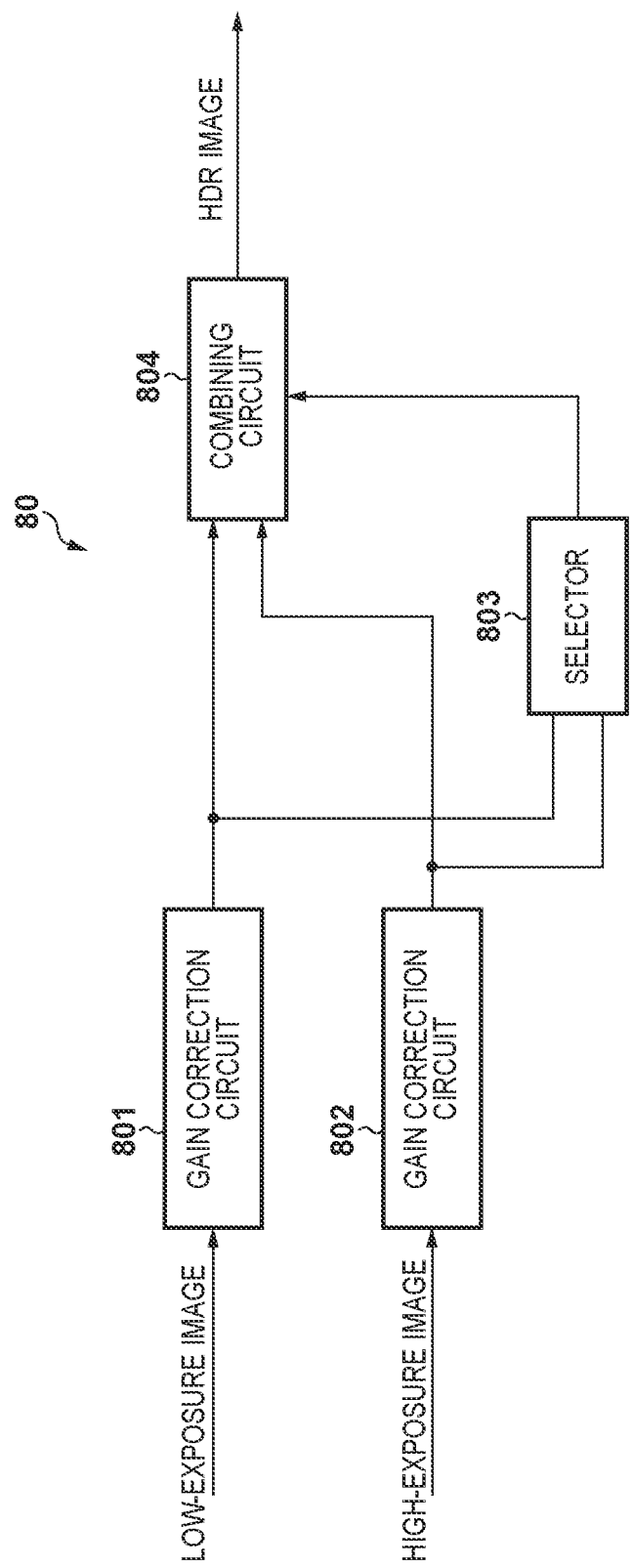

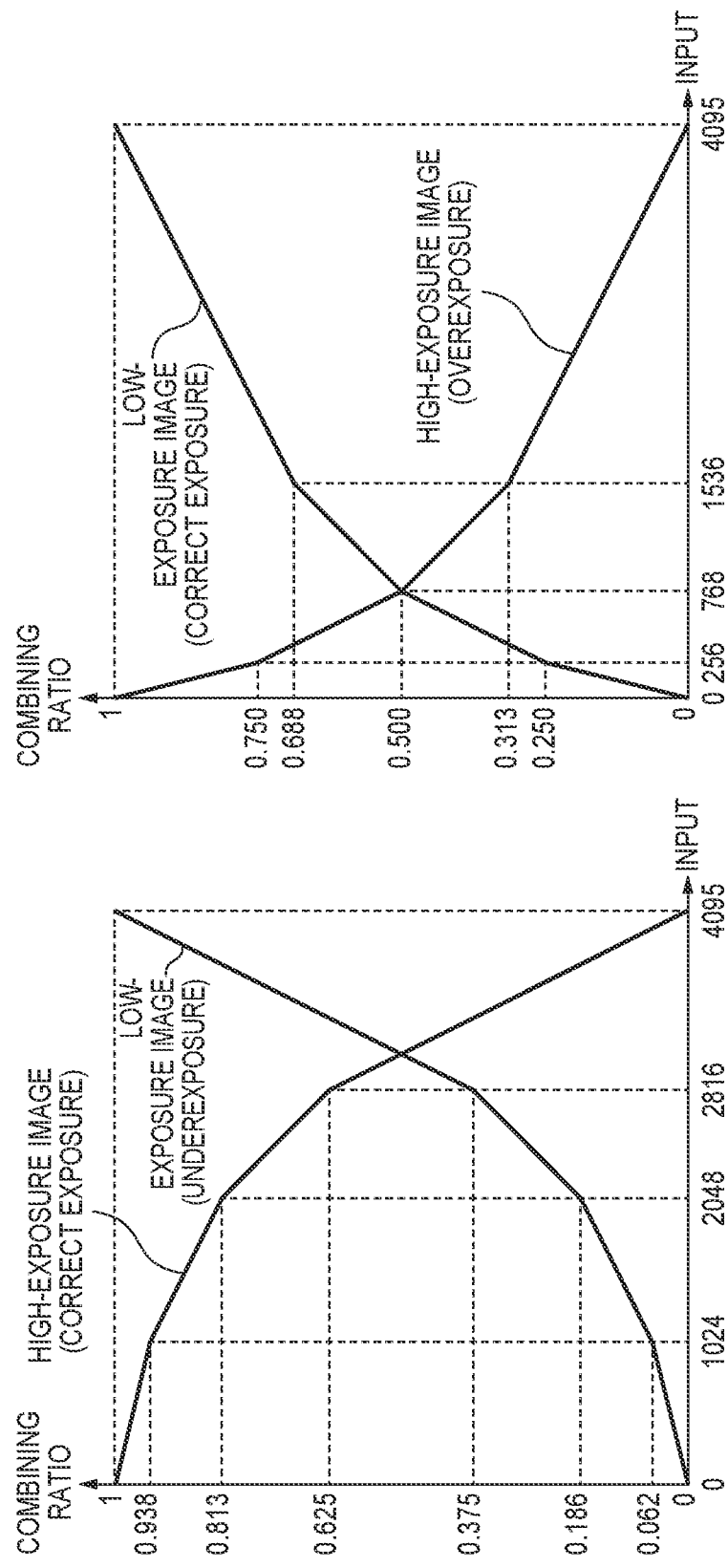

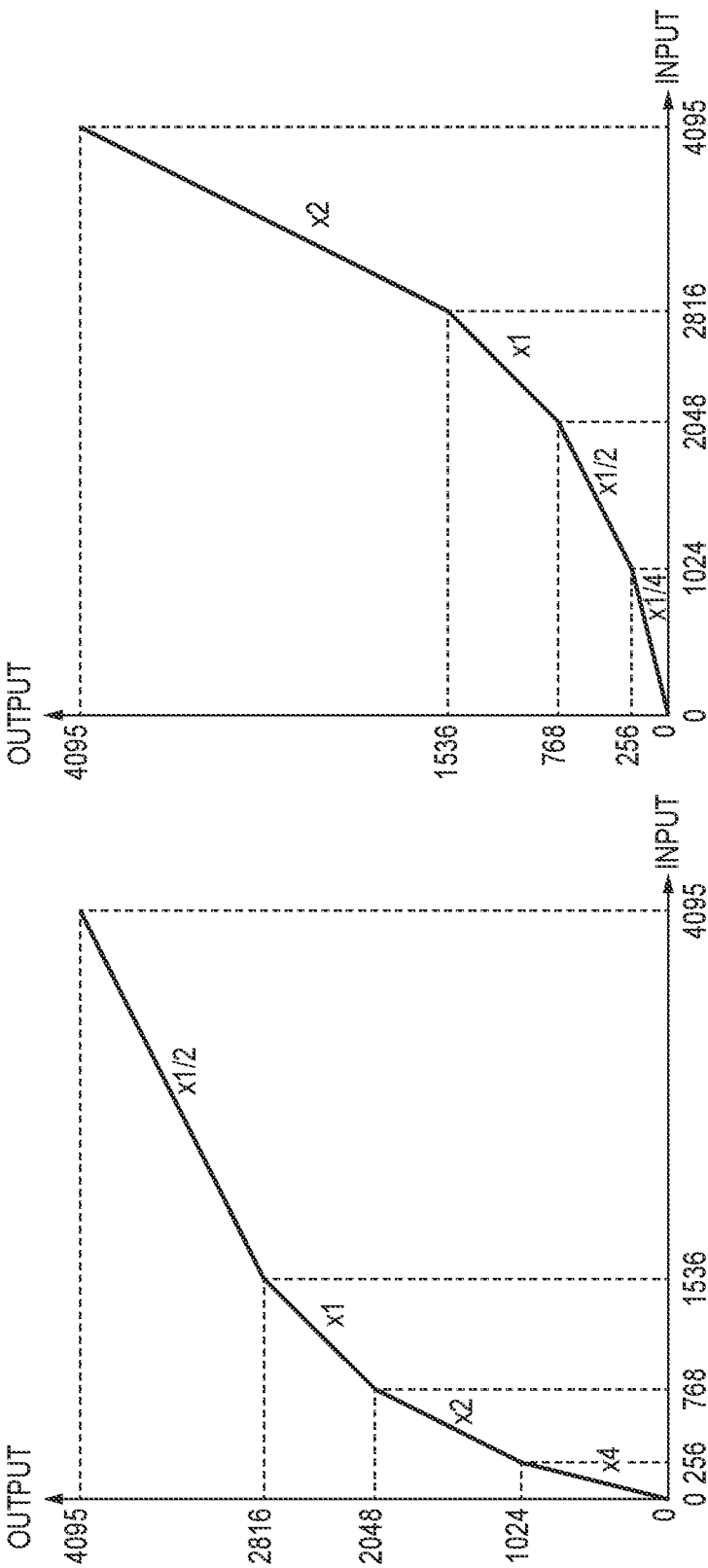

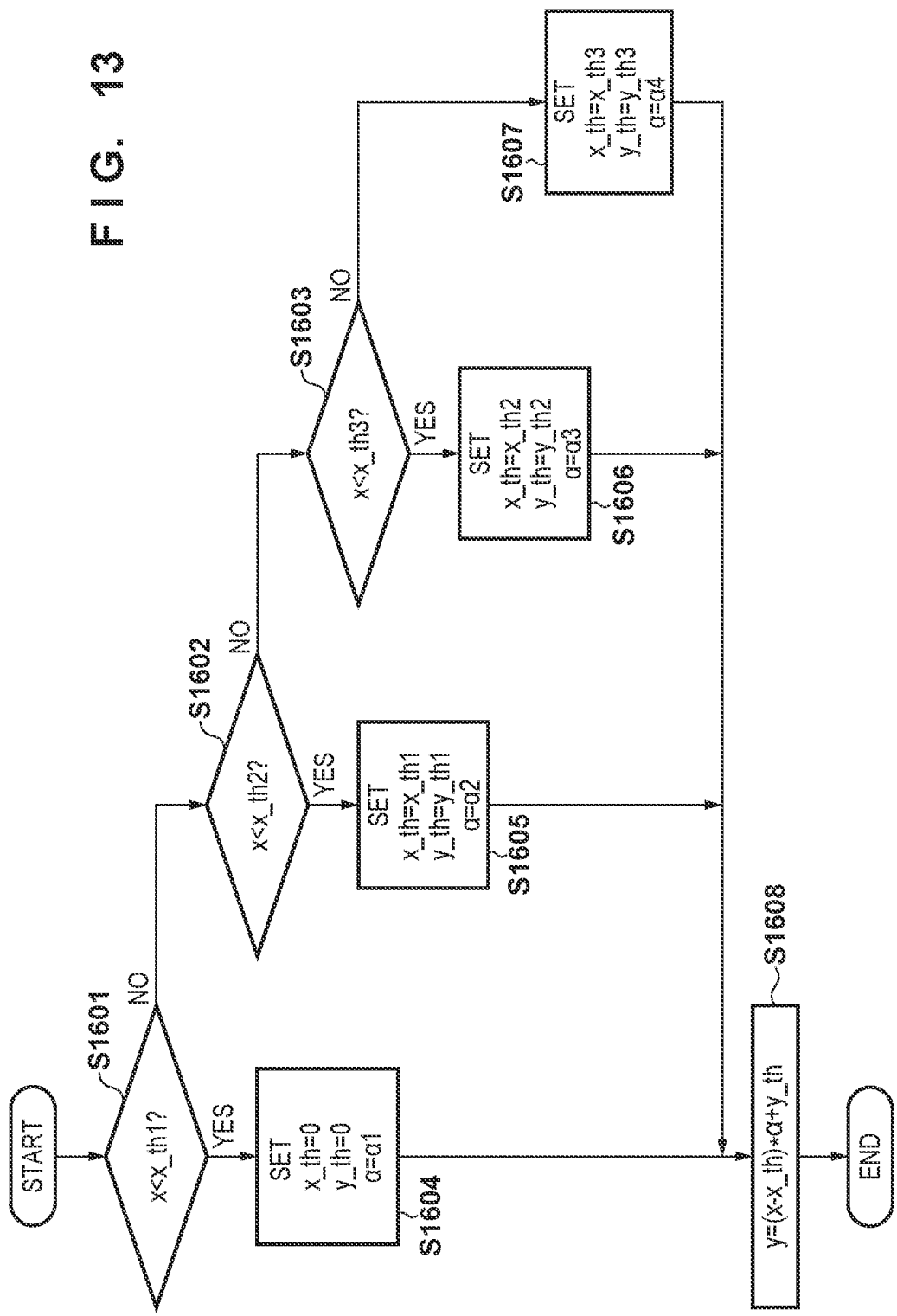

IMAGE PROCESSING APPARATUS, IMAGE PROCESSING METHOD, AND IMAGE CAPTURE APPARATUS

BACKGROUND OF THE INVENTION

Field of the Invention

The present invention relates to an image processing apparatus, an image processing method, and an image capture apparatus, and relates particularly to a technique for generating a combined image.

Description of the Related Art

A technique of generating an image with an extended dynamic range (HDR (High Dynamic Range) image) by combining a plurality of images captured with different exposure amounts is known.

Japanese Patent Laid-Open No. 2019-186910 discloses a technique of generating an HDR image by combining a plurality of image signals generated by applying different gains to an image signal obtained through a single image capture, instead of capturing images multiple times with different exposure amounts.

The technique described in Japanese Patent Laid-Open No. 2019-186910 has an advantage of being able to generate an HDR image through a single image capture. However, since a signal is read from each pixel of an image sensor multiple times, the amount of data to be processed in a one-frame transmission period increases, and the bandwidth of a memory and a data bus may become insufficient. Meanwhile, simply reducing the data amount of an image signal may cause degradation of image quality of the HDR image.

SUMMARY OF THE INVENTION

The present invention provides, as its one aspect, an image processing apparatus, an image processing method, and an image capture apparatus that efficiently generate a combined image with less image degradation.

According to an aspect of the present invention, there is provided an image processing apparatus comprising: an obtaining circuit that obtains a plurality of pieces of image data with different exposure amounts; a conversion circuit that performs a level-conversion of the plurality of pieces of image data by applying input/output characteristics to the plurality of pieces of image data; an encoding circuit that applies encoding to reduce a data amount of the plurality of pieces of image data that has been performed the level-conversion; a decoding circuit that decodes the plurality of pieces of image data that has been encoded; an inversion circuit that applies inverse characteristics of the input/output characteristics to the plurality of pieces of image data that have been decoded; and a combining circuit that generates combined image data from the plurality of pieces of image data output by the inversion circuit, wherein the input/output characteristics are set in accordance with a combining ratio of each of the plurality of pieces of image data in the combining circuit.

According to another aspect of the present invention, there is provided an image capture apparatus comprising: an image processing apparatus that comprises: an obtaining circuit that obtains a plurality of pieces of image data with different exposure amounts; a conversion circuit that performs a level-conversion of the plurality of pieces of image data by applying input/output characteristics to the plurality of pieces of image data; an encoding circuit that applies encoding to reduce a data amount of the plurality of pieces of image data that has been performed the level-conversion; a decoding circuit that decodes the plurality of pieces of image data that has been encoded; an inversion circuit that applies inverse characteristics of the input/output characteristics to the plurality of pieces of image data that have been decoded; and a combining circuit that generates combined image data from the plurality of pieces of image data output by the inversion circuit, wherein the input/output characteristics are set in accordance with a combining ratio of each of the plurality of pieces of image data in the combining circuit; and an imaging circuit that outputs the plurality of pieces of image data.

According to a further aspect of the present invention, there is provided an image processing method comprising: obtaining a plurality of pieces of image data with different exposure amounts; performing a level-conversion of the plurality of pieces of image data by applying input/output characteristics to the plurality of pieces of image data; applying encoding to reduce a data amount of the plurality of pieces of image data that has been performed the level-converted; decoding the plurality of pieces of image data that has been encoded; applying inverse characteristics of the input/output characteristics to the plurality of pieces of image data that has been decoded; and generating combined image data from the plurality of pieces of image data to which the inverse characteristics have been applied, wherein the input/output characteristics are set in accordance with a combining ratio of the plurality of pieces of image data in the combining.

According to another aspect of the present invention, there is provided a non-transitory computer-readable storage medium storing a program for causing a computer to function as an image processing apparatus comprising: an obtaining unit configured to obtain a plurality of pieces of image data with different exposure amounts; a conversion unit configured to perform a level-conversion of the plurality of pieces of image data by applying input/output characteristics the plurality of pieces of image data; an encoding unit configured to apply encoding to reduce a data amount of the plurality of pieces of image data that has been performed the level-conversion; a decoding unit configured to decode the plurality of pieces of image data that has been encoded; an inversion unit configured to apply inverse characteristics of the input/output characteristics to the plurality of pieces of image data that has been decoded; and a combining unit configured to generate combined image data from the plurality of pieces of image data output by the inversion unit, wherein the input/output characteristics are set in accordance with a combining ratio of each of the plurality of pieces of image data in the combining unit.

Further features of the present invention will become apparent from the following description of exemplary embodiments (with reference to the attached drawings).

BRIEF DESCRIPTION OF THE DRAWINGS

FIG. 1 is a block diagram showing an example of a functional configuration of an image capture apparatus 10 according to an embodiment.

FIG. 2 shows an example of a functional configuration of an imaging circuit 20 according to a first embodiment.

FIG. 3 shows an example of a circuit configuration covering from a unit pixel 201 to a horizontal transfer circuit 205 in FIG. 2.

FIG. 5 is a block diagram showing an example of a functional configuration of a combining circuit 80 according to the embodiment.

FIGS. 7A and 7B show examples of combining ratios used in a combining circuit 804 according to the embodiment.

FIGS. 11A and 11B show examples of input/output characteristics of the level conversion circuit 30 according to the embodiment.

FIG. 13 is a flowchart related to an operation of the level conversion circuit 30 according to the embodiment.

DESCRIPTION OF THE EMBODIMENTS

Figure 4A:
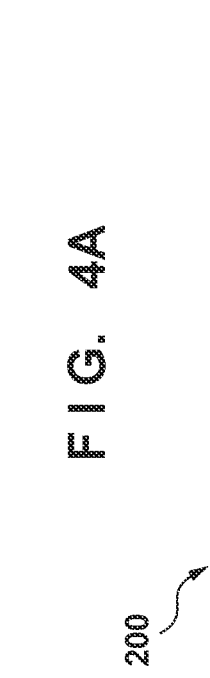
FIGS. 4A to 4D show a pixel arrangement in a pixel array 200, settings of exposure time, and image output formats in a normal mode and an HDR mode according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following description will be given of the case of carrying out the present invention in an image capture apparatus such as a digital camera. However, the image capture apparatus is an example of an image processing apparatus in which the present invention can be carried out. The image processing apparatus in which the present invention can be carried out may be any electronic device capable of processing image signals obtained from an image sensor. Examples of such electronic devices include a computer device (personal computer, tablet computer, media player, PDA etc.), a mobile phone, a smartphone, a game machine, a robot, a drone, and a drive recorder. These are examples, and the present invention can also be carried out in other electronic devices.

First Embodiment

Overview of Image Capture Apparatus

FIG. 1 is a block diagram showing an example of a functional configuration of an image capture apparatus 10 in which the present invention can be carried out. Each functional block of the image capture apparatus 10 may be realized by software, hardware, or a combination of the two, except for sections that can only be realized by hardware, such as an image sensor, a memory 50, and a recording medium 110. For example, a functional block may be realized by specialized hardware such as an ASIC. A functional block may also be realized by a processor such as a CPU executing a program stored in the memory. Note that a plurality of functional blocks may be realized by a common configuration (e.g., one ASIC). Hardware that realizes some functions of one functional block may be included in hardware that realizes another functional block.

An imaging circuit 20 includes an optical system that generates an optical image of a subject, and an image sensor that converts the optical image generated by the optical system into an electrical signal group. The optical system may be removable or fixed. The image sensor may be a CCD or CMOS image sensor, for example, and has a pixel section or a pixel array in which pixels with photoelectric conversion areas are arranged in a matrix, and peripheral circuits that supply control signals to the pixel section. In this embodiment, the imaging circuit 20 has an A/D conversion function and outputs a pixel signal group (RAW data) in digital format. A more specific configuration of the imaging circuit 20 will be described later.

A level conversion circuit 30 converts the level of each pixel signal that constitutes image data supplied from the imaging circuit 20, in accordance with set input/output characteristics.

An encoding circuit 40 encodes image data supplied from the level conversion circuit 30 and generates encoded data with a smaller data amount than the image data. The details of the encoding circuit 40 will be described later. The encoded data is stored in a memory 50. The memory 50 functions as a buffer memory for the encoded data.

A decoding circuit 60 reads and decodes the encoded data stored in the memory 50. The decoding circuit 60 outputs image data obtained by the decoding to a level inversion circuit 70. The bandwidth usage of a transmission path from the encoding circuit 40 to the decoding circuit 60 can be reduced by reducing the data amount of the image data through the encoding. Thus, shortage of the bandwidth of the transmission path can be prevented even when a plurality of frames of image data need to be transmitted in a single shooting. In addition, the processing speed required by the decoding circuit 60 can be reduced by installing the memory 50 between the encoding circuit 40 and the decoding circuit 60.

The level inversion circuit 70 converts the level of each pixel signal that constitutes the image data using input/output characteristics that are the reverse of those applied by the level conversion circuit 30. Combining these two sets of input/output characteristics results in linear input/output characteristics with input and output that are equal. The level inversion circuit 70 outputs the level-converted image data to the combining circuit 80.

The combining circuit 80 generates combined image data by combining a plurality of frames of image data supplied from the level inversion circuit 70 based on later-described combining ratio characteristics. The combining circuit 80 outputs the generated combined image data to a development processing circuit 90.

The combined image data output by the combining circuit 80 is RAW data. The development processing circuit 90 applies development processing to the combined image data and generates image data to be displayed and/or recorded. More specifically, the development processing circuit 90 applies color interpolation processing, which is also called debayer (demosaic) processing, white balance adjustment processing, color space conversion processing, noise suppression processing, correction of distortions and aberrations caused by the optical system, enlargement and reduction processing, or the like. The development processing circuit 90 generates image data expressed in terms of brightness and color difference, such as YCbCr4:2:2. The development processing circuit 90 may also use the generated image data to generate evaluation values to be used by a control circuit 120 to adjust exposure and focus, and to detect feature areas in face recognition or the like.

Note that this embodiment has described a configuration for combining image data before subjected to development processing. However, the combining circuit 80 may alternatively be arranged on the downstream side of the development processing circuit 90 to combine image data after subjected to development processing.

A recording processing circuit 100 encodes, as necessary, the image data to be recorded that is output from the development processing circuit 90, and generates an image data file that contains the encoded data and associated information. For the encoding applied by the recording processing circuit 100, any encoding method adopted as a standard, such as MEG, JPEG2000, H.264, or HEVC/H.265, may be used.

The recording processing circuit 100 also records the generated image data file in a recording medium 110. The recording medium 110 may be a semiconductor memory card, an SSD, a hard disk drive, or the like. The recording medium 110 may be removable, built-in, or communicably connected to an external device.

A display processing circuit 130 scales the image data to be displayed or the image data to be recorded that is output from the development processing circuit 90 to the display size, and displays the scaled image data on a display device 140. The display processing circuit 130 also combines data of images that represent various kinds of information, such as set values in the image capture apparatus 10, with image data obtained by an image capture, and displays the resulting image data on the display device 140, and displays GUI screens such as a menu screen on the display device 140.

The display device 140 is, for example, a liquid crystal display. The display device 140 may be a touch display. The display device 140 is capable of functioning as an EVF (Electronic View Finder) by displaying a moving image on the display device 140 in real time.

An input device 121 is a generic term for keys, buttons, switches, dials, and so on that allow a user to input instructions to the image capture apparatus 10. If the display device 140 is a touch display, the touch panel portion is included in the input device 121.

The control circuit 120 has a CPU, a ROM, and a RAM. Although omitted in FIG. the control circuit 120 is communicably connected to each functional block of the image capture apparatus 10. The control circuit 120 loads a program stored in the ROM into the RAM and executes the program with the CPU to control the operation of each functional block in the image capture apparatus 10 and realize the functions of the image capture apparatus 10. The control circuit 120 monitors the input device 121, and performs, upon detecting a manipulation of the input device 121, an operation corresponding to the manipulation.

Imaging Circuit 20

The image sensor of the imaging circuit 20 is capable of controlling the exposure time (charge accumulation time) on a pixel-by-pixel basis. Thus, a plurality of frames of image data with overlapping exposure periods and different exposure amounts can be output within a predetermined one-frame period by appropriately arranging groups of pixels controlled with different exposure times. For example, with use of an image sensor having color filters in the Quad Bayer arrangement, two frames of image data with different exposure times can be obtained by controlling two of the 2×2 adjacent pixels of the same color with a first exposure time and the remaining two pixels with a second exposure time. In this case, if image data is generated in normal shooting using 2×2 pixels of the same color as one pixel, the resolution of the two frames of image data with different exposure times is equal to the resolution of the image data obtained in the normal shooting.

Note that there is no specific limitation on how to obtain a plurality of frames of images with overlapping exposure periods and different exposure amounts within a one-frame period by controlling the exposure time on a pixel-by-pixel basis. An HDR image can be obtained with a single exposure by combining the plurality of frames of thus-obtained image data for each corresponding pixel between frames.

The imaging circuit 20 has a plurality of operating modes, including a normal mode in which the exposure time is equal for all pixels, and an HDR mode in which the exposure time is different between pixel groups.

In the normal mode, the imaging circuit 20 outputs one frame of image data with a predetermined exposure amount in a single shooting. On the other hand, in the HDR mode, the imaging circuit 20 outputs a plurality of frames of image data with different exposure amounts in a single shooting. The exposure time in each operating mode may be determined by the control circuit 120 or set by the user through the input device 121.

In the HDR mode in this embodiment, image data with a low exposure amount is obtained from pixel groups controlled with the first exposure time, and image data with a high exposure amount is obtained from pixel groups controlled with the second exposure time (>first exposure time).

If image data of the same resolution is to be obtained in the normal mode and the HDR mode, the amount of image data output from the imaging circuit 20 in a one-frame period is twice as large in the HDR mode as in the normal mode. For this reason, the number of each of one or more functional blocks provided in the later stage from the level conversion circuit 30 to the development processing circuit 90 may be more than one. In addition, three or more types of exposure time may be used in the HDR mode.

FIG. 2 is a block diagram showing an example of a configuration of the imaging circuit 20. In a pixel array 200, a plurality of unit pixels 201, each including a photodiode, and so on, are arranged in a matrix. The operation of the unit pixels 201 arranged in the pixel array 200 is controlled by control signals supplied by a timing control circuit 208. Accordingly, the exposure time of the unit pixels 201 is also controlled by the timing control circuit 208.

A vertical scanning circuit 202 sequentially selects the unit pixels 201 on a row-by-row basis. The vertical scanning circuit 202 controls the rows to be selected and the order in which they are selected so that pixel signals can be read from all the rows during a one-frame period.

A column amplifier circuit 203 has a plurality of column amplifiers arranged for respective columns of the pixel array 200, and amplifies the voltage of the read pixel signals. It is possible to relatively increase the pixel signal level with respect to noise generated in a column ADC circuit 204 in the later stage and improve the S/N ratio by amplifying the signals with the column amplifier circuit 203.

The column ADC circuit 204 has a plurality of A/D converters arranged for the respective columns of the pixel array 200, and each A/D converter converts pixel signals output from the corresponding column amplifier into digital pixel signals. The digital pixel signals are sequentially read by a horizontal transfer circuit 205 and input to a signal processing circuit 206.

The signal processing circuit 206 adds an offset value to each pixel signal and applies a shift operation (multiplication/division) to add digital gain to the pixel signal. If the pixel array 200 has a light-shielded pixel (optical black) area, black-level clamping may be performed based on pixel signals obtained from the optical black area. The signal processing circuit 206 has a parallel-serial conversion function and converts a signal dealt with as a multi-bit parallel signal by the signal processing circuit 206 into a serial signal. The signal processing circuit 206 converts this serial signal to an LVDS signal or the like, and outputs the converted signal to an external device and the level conversion circuit 30.

The memory 207 temporarily holds the digital pixel signals that have been read from the pixel array 200 and processed by the column amplifier circuit 203, the column ADC circuit 204, and the signal processing circuit 206.

The timing control circuit 208 supplies an operating clock signal and a timing signal to each block in the imaging circuit 20 to control the overall operation of the imaging circuit 20. The timing control circuit 208 can also control the exposure time of the unit pixels 201 using later-described control signals 216 and 217.

Next, a description will be given, with reference to FIG. 3, of how a pixel signal is read from a unit pixel 201 to the horizontal transfer circuit 205.

FIG. 3 shows an example of a circuit configuration of a unit pixel 201 and a configuration present between the unit pixel 201 and the horizontal transfer circuit 205.

A photoelectric conversion circuit 213 is a photodiode and converts light incident on the unit pixel 201 into an electric charge. A transfer switch 215 is turned on and off by the control signal 216. When the transfer switch 215 is on, it transfers the charge generated by the photoelectric conversion circuit 213 to a charge retention circuit 218.

The control signals 216 and 217 are signals for turning on and off the transfer switch 215 of the unit pixel 201. Either one of the control signals 216 and 217 is supplied to the unit pixel 201. The timing control circuit 208 controls the exposure time of all the unit pixels 201 at the same timing and period by making the control signals 216 and 217 into the same signal in the normal mode. On the other hand, in the HDR mode, the timing control circuit 208 makes the timing of the control signals 216 and 217 different so that the respective periods from the start of a charge accumulation period to the start of charge transfer are different. This allows the charge accumulation period, i.e., the exposure time to be different between unit pixels 201 to which the control signal 216 is supplied and unit pixels 201 to which the control signal 217 is supplied.

The charge retention circuit 218 is a floating diffusion that holds the charge transferred from the photoelectric conversion circuit 213 through the transfer switch 215 and converts the charge into a voltage. If a pixel row that includes the unit pixel 201 is selected by the vertical scanning circuit, a pixel amplifier 219 amplifies the voltage level of the charge retention circuit 218 and outputs the voltage to a corresponding column amplifier in the column amplifier circuit 203 through a vertical signal line (column signal line) 220. A current control circuit 221 controls the current running through the vertical signal line 220.

The column ADC circuit 204 has an A/D conversion circuit 222, memories 223 and 224, and a subtractor 225 for each column. The A/D conversion circuit 222 converts the voltage value output by the column amplifier into a digital signal with a value within a range (e.g., 8 bits (0 to 255), 12 bits (0 to 4096) etc.) corresponding to a predetermined bit depth. The memories 223 and 224 temporarily hold the digital signal output by the A/D conversion circuit 222.

The memory 223 holds a digital signal that is a pixel signal based on the charge read from the photoelectric conversion circuit 213 plus a noise signal of a readout circuit section (circuits from the charge retention circuit 218 to the A/D conversion circuit 222). Meanwhile, the memory 224 holds the noise signal of the readout circuit section. This noise signal is equivalent to a pixel signal that is read when the charge retention circuit 218 is reset. The subtractor 225 subtracts the output of the memory 224 from the output of the memory 223, and outputs the subtraction result as a pixel signal to the horizontal transfer circuit 205.

Next, a pixel arrangement structure of the pixel array 200 will be described with reference to FIG. 4A. In this embodiment, the pixel array 200 of the image sensor is provided with a color filter with the Quad Bayer arrangement. That is, the pixel array 200 has a configuration in which each one pixel in a general Bayer arrangement is divided into four pixels including two pixels in the horizontal direction and two pixels in the vertical direction. It can also be considered as a Bayer arrangement in units of 2×2 pixels. In the following, a pixel provided with a red (R) color filter will be called a red pixel or an R pixel. The same applies to pixels provided with green (Gr or Gb) and blue (B) color filters.

A description will be given, with reference to FIG. 4B, of an example of how to control the exposure time of each unit pixel of the pixel array 200 with the pixel arrangement shown in FIG. 4A in the HDR mode. In the following description, an orthogonal coordinate system is set up with an axis in the horizontal direction of the pixel array 200 as an x-axis and an axis in the vertical direction as a y-axis, and the position of a pixel is represented by a combination of an x-coordinate (column number) and a y-coordinate (row number). The coordinates of a pixel at the upper left corner are (1, 1).

Figure 4B:
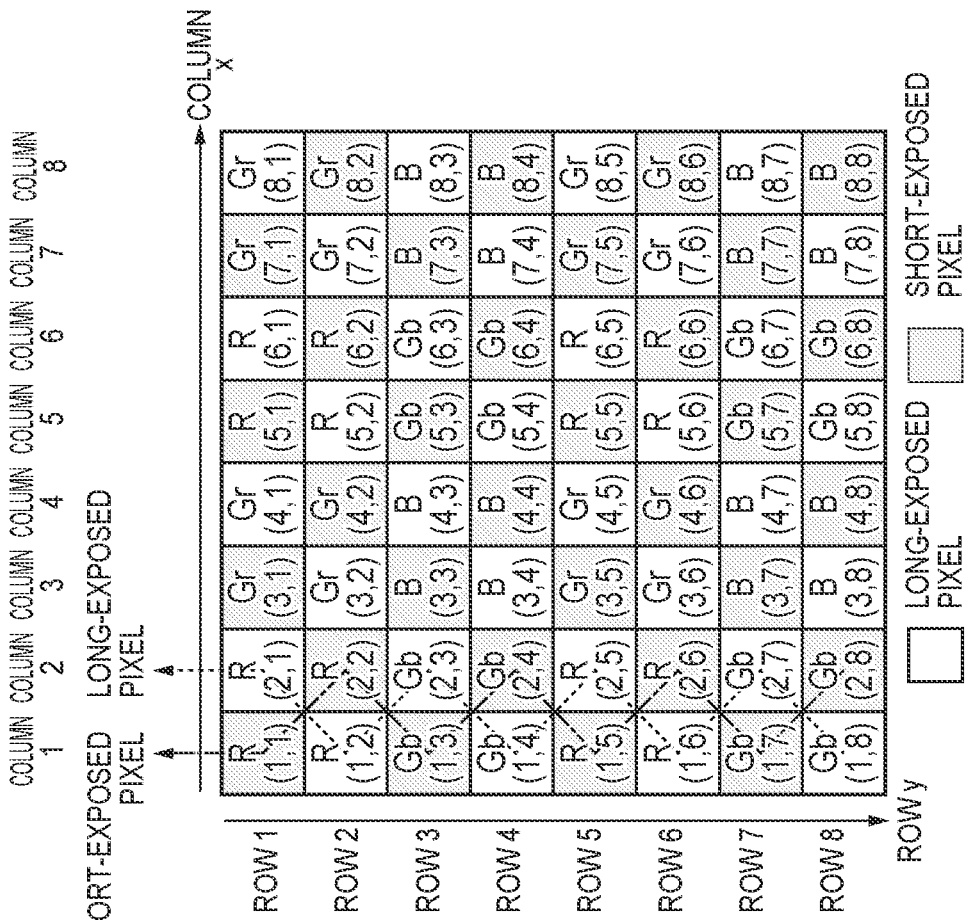

In FIG. 4B, control is performed so that the first exposure time is applied to gray pixels, and second exposure time is applied to white pixels. Here, the second exposure time is longer than the first exposure time. Accordingly, the gray pixels and the white pixels will be referred to as short-exposed pixels and long-exposed pixels, respectively. In this embodiment, either one of the control signals 216 and 217 is supplied to each unit pixel so that pixels of the same exposure time are not adjacent to each other in the horizontal and vertical directions, as shown in FIG. 4B. Thus, the exposure time is controlled so that the same exposure time is applied to every two pixels located diagonally, of 2×2 adjacent pixels of the same color.

For example, the coordinate settings of four R pixels at the upper left end are as follows.

R(1, 1): short-exposed pixel
R(2, 1): long-exposed pixel
R(1, 2): long-exposed pixel
R(2, 2): short-exposed pixel In this manner, the short-exposed pixels and the long-exposed pixels are alternately put in each column, and the short-exposed pixels and the long-exposed pixels are alternately put in each row. When only the short-exposed pixels are traced in the y direction in the first and second columns from the top, in the first row, the short-exposed pixel is in the first column;
in the second row, the short-exposed pixel is in the second column;
in the third row, the short-exposed pixel is in the first column; and
in the fourth row, the short-exposed pixel is in the second column.

The short-exposed pixels are thus arranged in a zigzag shape.

Similarly, when only the long-exposed pixels are traced in the y direction in the first and second columns from the top, in the first row, the long-exposed pixel is in the second column;
in the second row, the long-exposed pixel is in the first column;
in the third row, the long-exposed pixel is in the second column; and
in the fourth row, the long-exposed pixel is in the first column.

The long-exposed pixels are thus arranged in a zigzag shape.

Next, a description will be given, with reference to FIG. 4C, of the arrangement of the pixel signals output from the pixel array 200 with the pixel arrangement shown in FIG. 4A in the normal mode. When the imaging circuit 20 operates in the normal mode, control is performed so that the exposure time is equal for all the unit pixels 201. In the normal mode, the imaging circuit 20 outputs pixel signals with every 2×2 pixels of the same color indicated by a gray diamond in FIG. 4Ca dealt with as a single pixel. For example, a pixel signal output by the imaging circuit 20 shown in FIG. 4Cb can be derived as an average value of four pixels of the same color as follows.

$$\frac{R(1, 1) + R(2, 1) + R(1, 2) + R(2, 2)}{4} = \overline{R}(1, 1) \quad (1)$$

$$\frac{Gr(3, 1) + Gr(4, 1) + Gr(3, 2) + Gr(4, 2)}{4} = \overline{Gr}(2, 1) \quad (2)$$

$$\frac{Gb(1, 3) + Gb(2, 3) + Gb(1, 4) + Gb(2, 4)}{4} = \overline{Gb}(1, 2) \quad (3)$$

$$\frac{B(3, 3) + B(4, 3) + B(3, 4) + B(4, 4)}{4} = \overline{B}(2, 2) \quad (4)$$

Figure 4C:
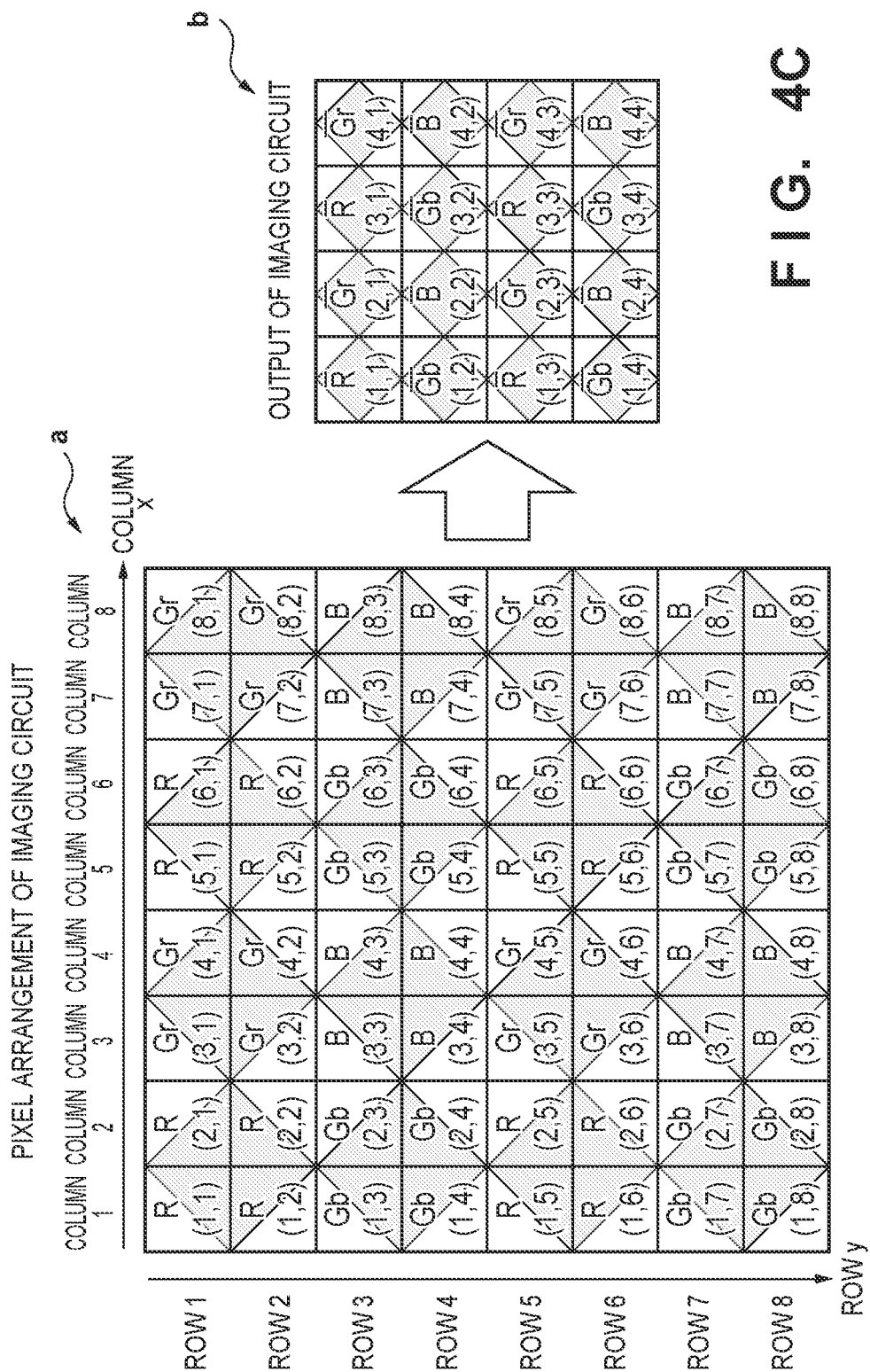

As shown in FIG. 4Cb, the arrangement of R pixels, Gr pixels, Gb pixels, and B pixels in the image data output from the imaging circuit 20 is the same arrangement as the image data output from an image sensor with color filters with general Bayer arrangement.

Figure 4D:
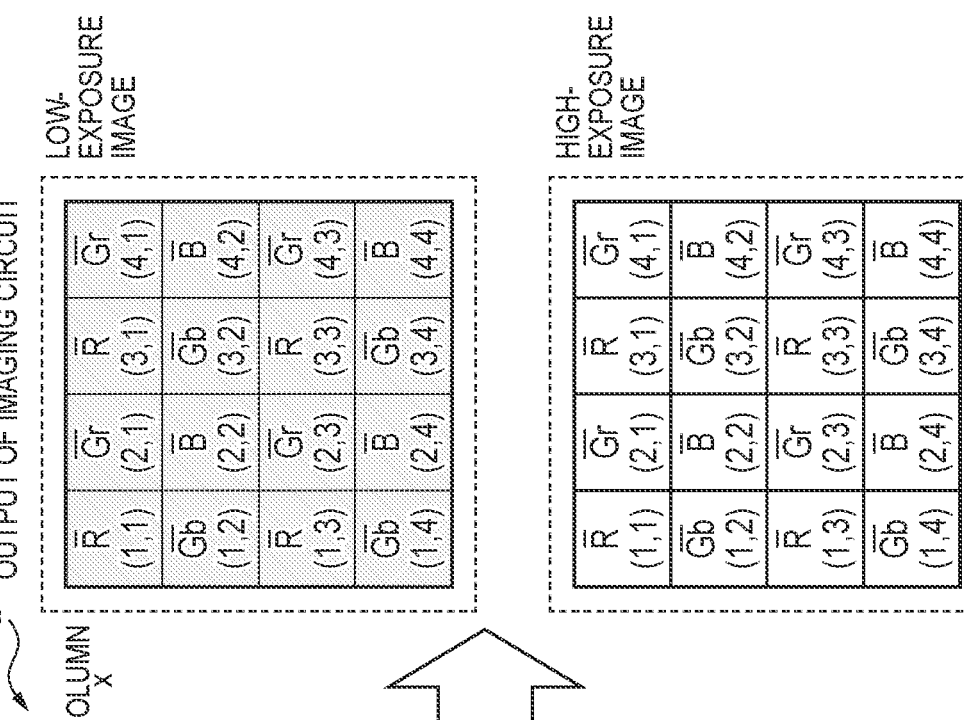

Next, a description will be given, with reference to FIG. 4D, of the arrangement of the pixel signals output from the pixel array 200 with the pixel arrangement shown in FIG. 4A in the HDR mode. When the imaging circuit 20 operates in the HDR mode, control is performed so that the short-exposed pixels and the long-exposed pixels are arranged as shown in FIG. 4B. In the HDR mode, the imaging circuit 20 outputs pixel signals with two pixels with the same exposure time, of 2×2 pixels of the same color, dealt with as a single pixel. Specifically, pixel signals read from two short-exposed pixels are output as a pixel signal for one pixel of a low-exposure image, and pixel signals read from two long-exposed pixels is output as a pixel signal for one pixel of a high-exposure image.

For example, low-exposure image data shown in FIG. 4Db can be derived as an average value of pixel signals of the short-exposed pixels of the same color as follows.

$$\frac{R(1, 1) + R(2, 2)}{2} = \overline{R}(1, 1) \quad (5)$$

$$\frac{Gr(3, 1) + Gr(4, 2)}{2} = \overline{Gr}(2, 1) \quad (6)$$

$$\frac{Gb(1, 3) + Gb(2, 4)}{2} = \overline{Gb}(1, 2) \quad (7)$$

$$\frac{B(3, 3) + B(4, 4)}{2} = \overline{B}(2, 2) \quad (8)$$

Meanwhile, high-exposure image data shown in FIG. 4Db can be derived as an average value of pixel signals of the long-exposed pixels of the same color as follows.

$$\frac{R(2, 1) + R(1, 2)}{2} = \overline{R}(1, 1) \quad (9)$$

$$\frac{Gr(4, 1) + Gr(3, 2)}{2} = \overline{Gr}(2, 1) \quad (10)$$

$$\frac{Gb(2, 3) + Gb(1, 4)}{2} = \overline{Gb}(1, 2) \quad (11)$$

$$\frac{B(4, 3) + B(3, 4)}{2} = \overline{B}(2, 2) \quad (12)$$

In the HDR mode in this embodiment, the pixel levels of the low-exposure image data and the high-exposure image data output from the imaging circuit 20 are converted by the level conversion circuit 30 using input/output characteristics prepared for the respective image data. However, the input/output characteristics used in the level conversion circuit 30 are determined based on the combining ratio in the combining circuit 80. Therefore, a method of generating a combined image (HDR image) in the combining circuit 80 will be described first.

Combining Circuit 80

FIG. 5 is a block diagram showing an example of a functional configuration of the combining circuit 80. The combining circuit 80 has a gain correction circuit 801 for low-exposure images, a gain correction circuit 802 for high-exposure images, a selector 803, and a combining circuit 804.

When images with different exposures are combined to produce an HDR image, the plurality of images to be combined often include an image obtained through shooting at correct exposure and images obtained through shooting with overexposure and/or underexposure relative to the correct exposure. In this case, the image obtained through shooting with the correct exposure is used as a reference image, and the remaining images are used to extend the dynamic range by improving the gradation of the reference image. Note that it is not essential to use the image obtained through shooting with the correct exposure. In this embodiment, two frames of images including the image obtained through shooting with the correct exposure (correct exposure image) are combined for ease of explanation and understanding. A description will be given below of a combining operation in the cases where a high-exposure image is the correct exposure image and where a low-exposure image is the correct exposure image.

Note that in the image capture apparatus 10 of the present invention, the control circuit 120 performs automatic exposure control to determine shooting conditions (shutter speed, aperture value, ISO sensitivity etc.) for achieving the correct exposure in accordance with a user operation or a predetermined operating mode. The combining circuit 80 is capable of recognizing through the control circuit 120 which of the image data to be combined is the image obtained through shooting with the correct exposure.

The gain correction circuits 801 and 802 are used to make the exposure amounts of the low-exposure image and the high-exposure image uniform. The operations of the gain correction circuits 801 and 802 will be described in detail with reference to FIGS. 6A and 6B.

Figure 6A:
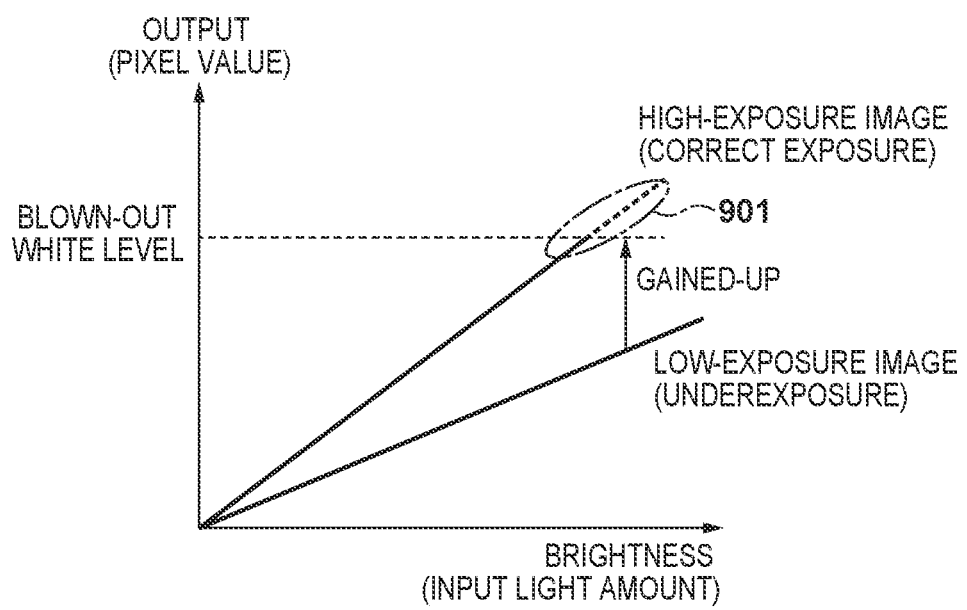
FIGS. 6A and 6B relate to operations of gain correction circuits 801 and 802 according to the embodiment.

FIG. 6A shows an example of the operations of the gain correction circuits 801 and 802 in the case where a high-exposure image is the correct exposure image. In this example, blown-out white occurs with the correct exposure, but does not occur when underexposed. In such a case, the gain correction circuit 801 applies a gain larger than 1 to the low-exposure image data (gain-up) to estimate the pixel value in an area 901 where blown-out white occurs in the high-exposure image.

Furthermore, HDR image data that has gradation even in the brightness area in which blown-out white occurs with the correct exposure can be generated by combining the gained-up low-exposure image data with the high-exposure image data in the combining circuit 804. In this case, the gain correction circuit 802 need not apply gain (or may apply a gain of 1) to the high-exposure image data.

Figure 6B:
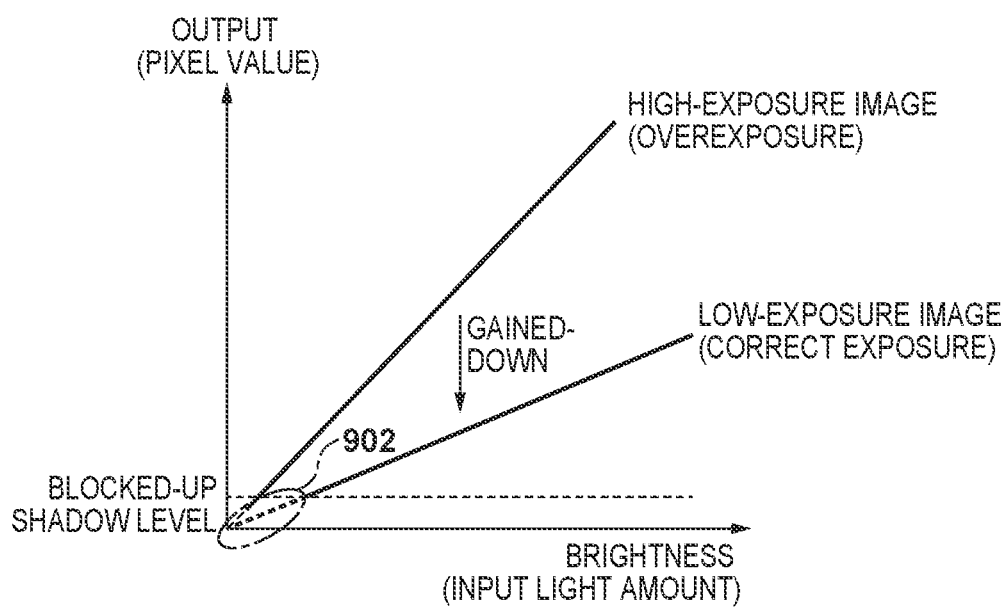

On the other hand, FIG. 6B shows an example of the operation of the gain correction circuits 801 and 802 in the case where a low-exposure image is the correct exposure image. In this example, blocked-up shadows occur with the correct exposure, but it does not occur when overexposed. In such a case, the gain correction circuit 802 applies a gain of less than 1 to the high-exposure image data (gain-down) to estimate the pixel value in an area 902 where blocked-up shadows occur in the low-exposure image.

Furthermore, HDR image data that has gradation even in the brightness areas where blocked-up shadows occur in the low-exposure image can be generated by combining the gained-down high-exposure image data with the low-exposure image data in the combining circuit 804. In this case, the gain correction circuit 801 need not apply gain (or may apply a gain of 1) to the low-exposure image data.

Note that the gain applied by the gain correction circuits 801 and 802 can be determined based on the ratio of the exposure amount or the exposure time between the low-exposure image and the high-exposure image. For example, it is assumed that high-exposure image data is obtained through shooting with the correct exposure, and the exposure amount ratio between the low-exposure image and the high-exposure image is 1:4. In this case, the gain applied to the low-exposure image data by the gain correction circuit 801 is 4. It is thus possible to quadruple the pixel values of the low-exposure image data and make the exposure amounts of the low-exposure image data and the high-exposure image data uniform. The ratio of the exposure amount or the exposure time can be controlled by parameters set to the timing control circuit 208 by the control circuit 120. Accordingly, the control circuit 120 can set the gain value for the gain correction circuit 801 or 802 that is to apply gain, in accordance with the ratio of the exposure amount or the exposure time.

The selector 803 outputs, to the combining circuit 804, pixel values of image data obtained through shooting with the correct exposure, of the low-exposure image data and the high-exposure image data output by the gain correction circuits 801 and 802.

The combining circuit 804 combines the low-exposure image data and the high-exposure image data output by the gain correction circuits 801 and 802 on a pixel-by-pixel basis to generate data of the combined image (HDR image). Here, an example of a combining method used in the combining circuit 80 will be described with reference to FIGS. 7A and 7B.

The horizontal axes of graphs in FIGS. 7A and 7B indicate the range of values that each pixel in the correct exposure image can take, and the vertical axes indicate the combining ratio (0 to 1) of the low-exposure image data or the high-exposure image data in the combined image. Note that in this embodiment, the bit depth of a pixel value is 12 bits (0 to 4095).

In this embodiment, the combining ratios are set for each piece of image data so that the sum of the combining ratios is always 1. That is, when two frames of image data are combined as in this embodiment, a pixel value hdr_img of the HDR image output from the combining circuit 804 can be derived using the following equation (13).

$$\alpha \times \text{main\_img} + (1 - \alpha) \times \text{sub\_img} = \text{hdr\_img} \quad (13)$$

Here, a denotes the combining ratio of image data obtained through shooting with the correct exposure, main_img denotes a pixel value of the image with the correct exposure, and sub_img denotes a pixel value of image data obtained through shooting with underexposure or overexposure.

FIG. 7A shows an example of the combining ratios of the high-exposure image data and the low-exposure image data in the case where the correct exposure image is a high-exposure image. In the example in FIG. 7A, the higher (brighter) the pixel values of the high-exposure image data become, the lower the combining ratio of the high-exposure image data becomes and the higher the combining ratio of the low-exposure image data becomes gradually. In low- and medium-brightness regions, the combining ratio of the high-exposure image data obtained through shooting with the correct exposure is larger than that of the low-exposure image data. On the other hand, in the high-brightness area, the combining ratio of the high-exposure image data is smaller than that of the low-exposure image data. This is because the high-exposure image data with the correct exposure is preferentially used in low- and medium-brightness areas, and low-exposure image data is used to improve gradation at a high-brightness portion at which blown-out white occurs.

FIG. 7B shows an example of the combining ratios of high-exposure image data and low-exposure image data in the case where the correct exposure image is the low-exposure image data. In the example shown in FIG. 7B, the higher (brighter) the pixel values of the low-exposure image data become, the higher the combining ratio of the low-exposure image data becomes and the lower the combining ratio of the high-exposure image data gradually. In the medium- and high-brightness areas, the combining ratio of the low-exposure image data obtained through shooting with the correct exposure is larger than that of the high-exposure image data. On the other hand, in the low-brightness area, the combining ratio of low-exposure image data is smaller than that of high-exposure image data. This is because the low-exposure image data with the correct exposure is preferentially used in the medium- and high-brightness areas, and the high-exposure image data is used to improve gradation in the low-brightness area where blocked-up shadows occur.

Note that FIGS. 7A and 7B show examples of gradually controlling the combining ratios for ease of explanation and understanding. Basically, the combining ratios can be determined using any method of expanding the dynamic range by improving the gradation in brightness areas where blown-out white and blocked-up shadows occur in the reference image data using other image data.

Thus, the combining ratios used in the combining circuit 80 are determined in accordance with the exposure amount and the pixel values of the images to be combined. Further, image data with a larger combining ratio also affects greater the image quality of the combined image. For this reason, image quality degradation due to encoding performed by the encoding circuit 40 is reduced by applying level conversion with consideration given to the combining ratio of the image data in the level conversion circuit 30. The details of the level conversion will be described later.

Encoding Circuit 40

Figure 8:
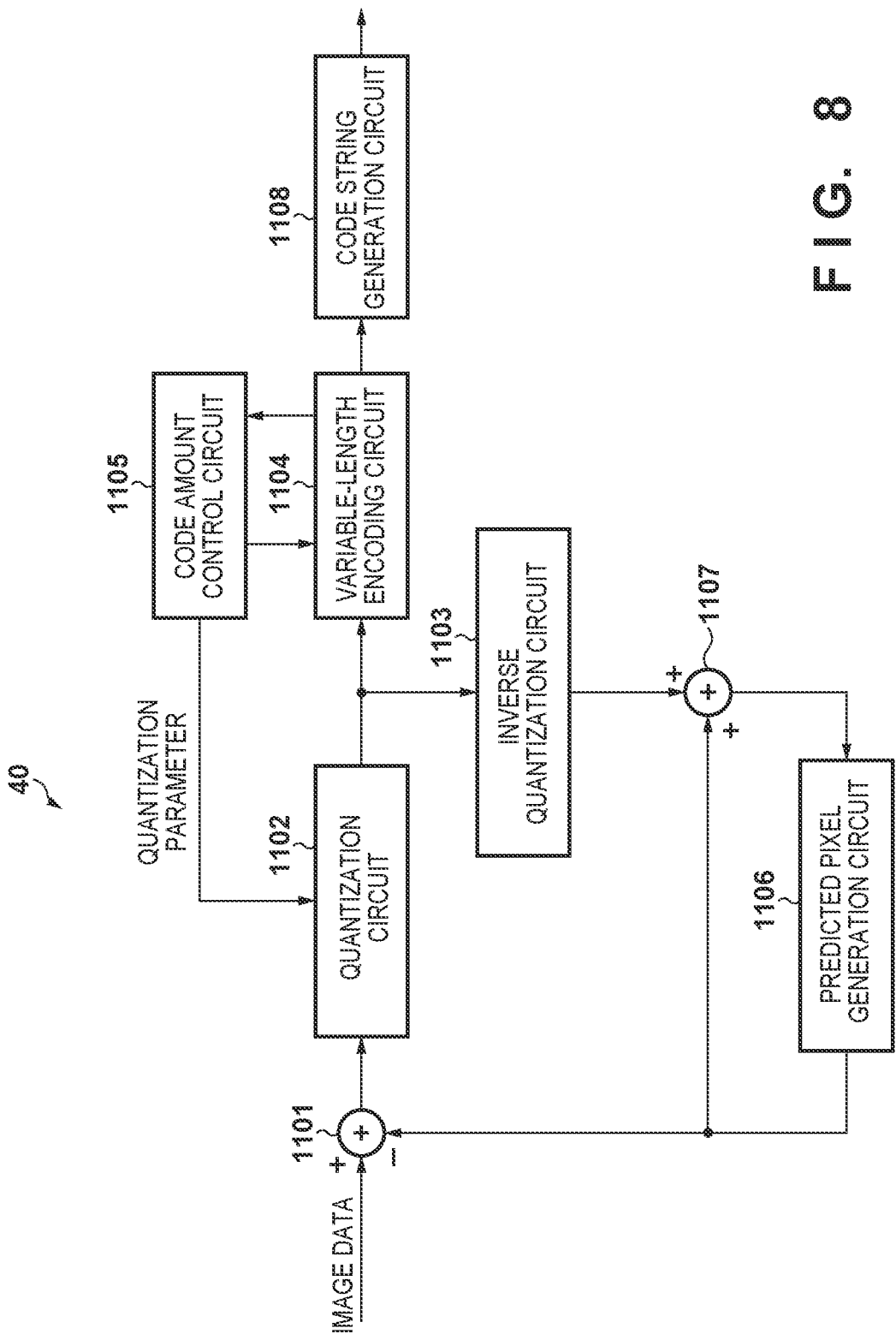
FIG. 8 is a block diagram showing an example of a functional configuration of an encoding circuit 40 according to the embodiment.

FIG. 8 is a block diagram showing an example of a functional configuration of the encoding circuit 40. In this embodiment, the encoding circuit 40 applies lossy encoding with quantization to each piece of pixel data that constitutes image data.

An adder 1101 obtains a difference between pixel data to which encoding is to be applied (pixel data of interest) and data of a predicted pixel that is generated by a predicted pixel generation circuit 1106. The adder 1101 outputs the obtained difference to a quantization circuit 1102.

The quantization circuit 1102 quantizes the difference input from the adder 1101 in accordance with a quantization parameter notified by a code amount control circuit 1105. More specifically, the quantization circuit 1102 truncates lower bits of the input difference by the number of bits indicated by the quantization parameter. If, for example, the value indicated by the quantization parameter is 4, the quantization circuit 1102 quantizes the difference by truncating the lower 4 bits of the input difference. The quantization circuit 1102 then outputs the quantized difference to a variable-length encoding circuit 1104 and an inverse quantization circuit 1103.

The variable-length encoding circuit 1104 encodes the value (quantized difference) input from the quantization circuit 1102 into a variable-length code. Variable-length encoding may be an entropy encoding method in which the smaller a value, the shorter a code length is assigned, thereby increasing the compression efficiency. The variable-length encoding circuit 1104 outputs the generated variable-length code to a code string generation circuit 1108. The variable-length encoding circuit 1104 also outputs the code length of the generated variable-length code to the code amount control circuit 1105.

The code amount control circuit 1105 references the code length input from the variable-length encoding circuit 1104, determines the quantization parameter for each predetermined number of pixels so that the code amount approaches a preset target compression ratio, and outputs the determined quantization parameter to the quantization circuit 1102.

The inverse quantization circuit 1103 inversely quantizes the quantized difference and outputs the result to an adder 1107. The adder 1107 adds an inverse quantized value and the predicted pixel value for the pixel of interest, and stores the result in the predicted pixel generation circuit 1106.

The predicted pixel generation circuit 1106 has a memory capable of holding a plurality of predicted pixel values output by the adder 1107. The predicted pixel generation circuit 1106 selects and outputs a predicted pixel value of a pixel located in a prediction direction with respect to the pixel of interest, e.g., the adjacent pixel to the left.

The code string generation circuit 1108 outputs, to the memory 50, an encoded stream that includes the variable-length code output from the variable-length encoding circuit 1104 and parameters necessary for decoding the code, such as the quantization parameter output from the code amount control circuit 1105.

The encoded stream stored in the memory 50 is output from the memory 50 to the decoding circuit 60, and is decoded.

Decoding Circuit 60

Figure 9:
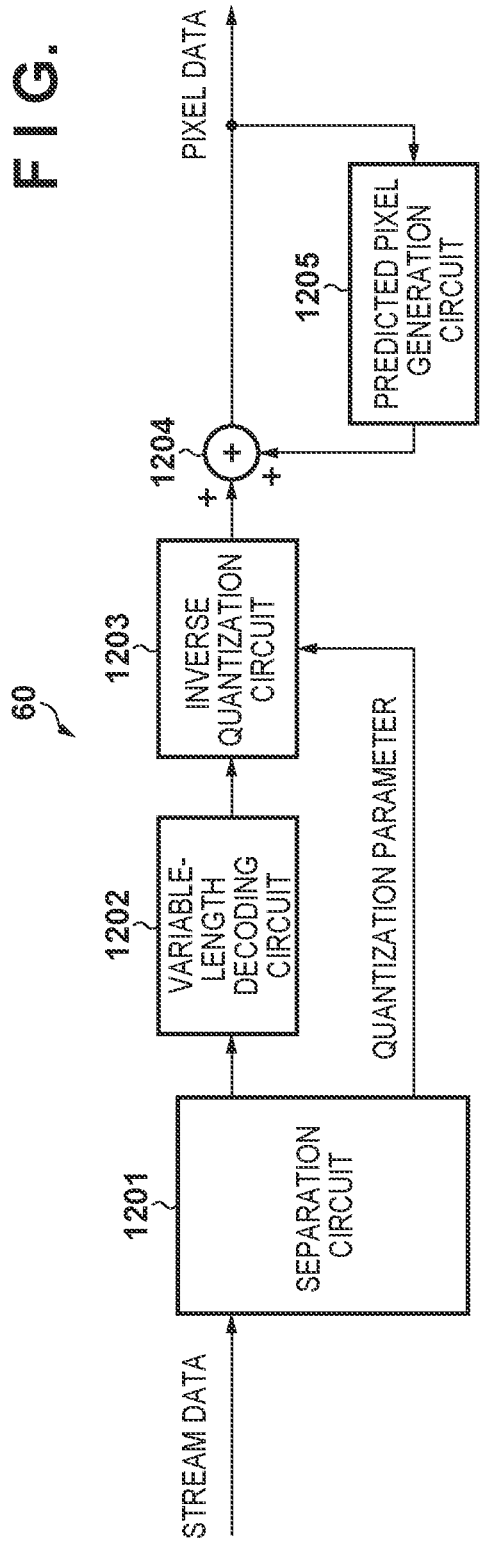
FIG. 9 is a block diagram showing an example of a functional configuration of a decoding circuit 60 according to the embodiment.

FIG. 9 is a block diagram showing an example of a functional configuration of the decoding circuit 60. In this embodiment, the decoding circuit 60 decodes the encoded stream stored in the memory 50.

A separation circuit 1201 analyzes the encoded stream and separates code data and the quantization parameter from the encoded stream. The separation circuit 1201 also outputs the code data to a variable-length decoding circuit 1202, and outputs the quantization parameter to an inverse quantization circuit 1203.

The variable-length decoding circuit 1202 decodes the input code data and outputs the decoded data to the inverse quantization circuit 1203.

The inverse quantization circuit 1203 inversely quantizes the decoded value input from the variable-length decoding circuit 1202 in accordance with the quantization parameter input from the separation circuit 1201, and outputs the result to an adder 1204.

A predicted pixel generation circuit 1205 has, for example, a capacity to hold a plurality of decoded pixels, and holds the output of the adder 1204. A pixel located in a prediction direction with respect to the pixel of interest, e.g., the adjacent pixel to the left is selected and output as a predicted pixel.

The adder 1204 adds the value input from the inverse quantization circuit 1203 and the predicted pixel value input from the predicted pixel generation circuit 1205, and outputs the result as decoded pixel data.

Level Conversion Circuit 30

Figure 10:
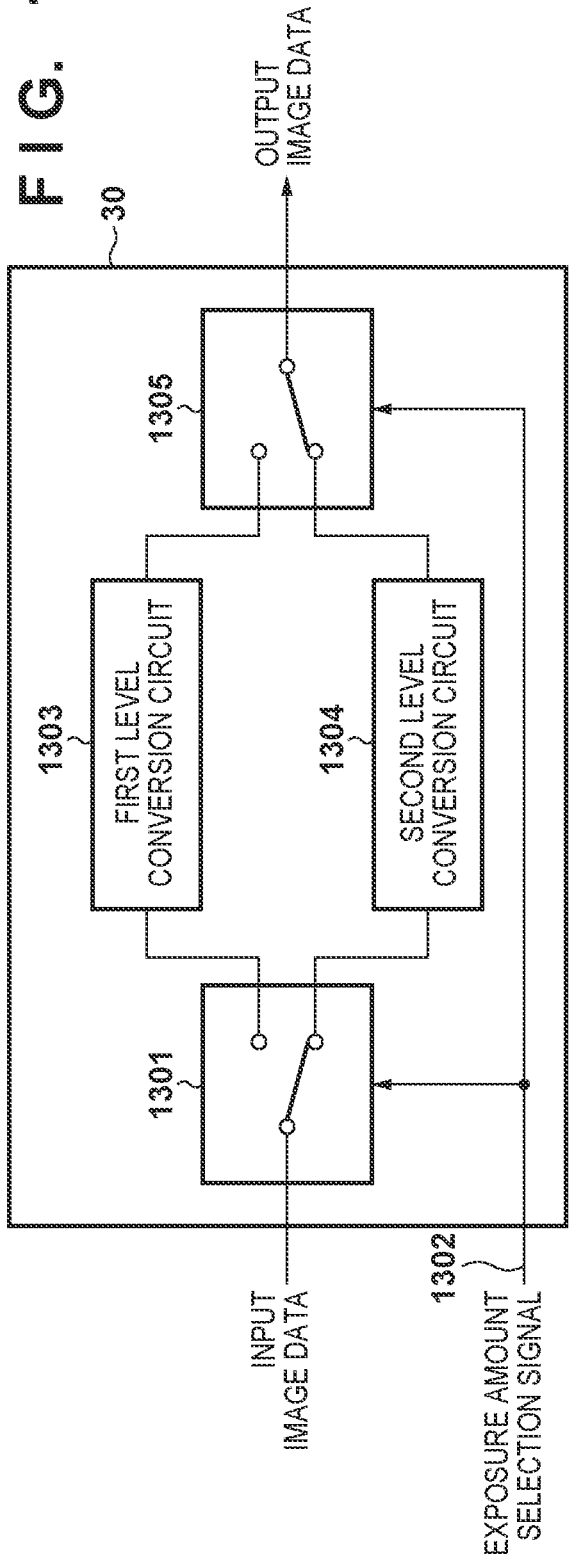
FIG. 10 is a block diagram showing an example of a functional configuration of a level conversion circuit 30 according to the embodiment.

FIG. 10 is a block diagram showing an example of a functional configuration of the level conversion circuit 30. It is assumed that the level conversion circuit 30 receives, from the imaging circuit 20, input of high-exposure image data and low-exposure image data that are time-division multiplexed on a pixel row-by-pixel row basis, for example.

A selector 1301 selects whether to input the input image data to a first level conversion circuit 1303 or a second level conversion circuit 1304, based on an exposure amount selection signal 1302. Note that the selector 1301 is not necessary in a configuration in which the same data is processed by both the first level conversion circuit 1303 and the second level conversion circuit 1304.

The exposure amount selection signal 1302 is input from the imaging circuit 20 and indicates whether the high-exposure image data or the low-exposure image data is input.

If the exposure amount selection signal 1302 indicates the high-exposure image data, the selector 1301 outputs the input image data to the first level conversion circuit 1303. If the exposure amount selection signal 1302 indicates the low-exposure image data, the selector 1301 outputs the input image data to the second level conversion circuit 1304.

The first level conversion circuit 1303 and the second level conversion circuit 1304 convert the value of each piece of pixel data that constitutes the input image data by applying the set input/output characteristics, and output the converted values. The input/output characteristics applied by the first level conversion circuit 1303 and the second level conversion circuit 1304 can be set and changed by the control circuit 120.

The first level conversion circuit 1303 applies the input/output characteristics for high-exposure image data, and the second level conversion circuit 1304 applies the input/output characteristics for low-exposure image data.

A selector 1305 selects which of the output of the first level conversion circuit 1303 and the output of the second level conversion circuit 1304 is to be output to the encoding circuit 40 in the later stage based on the exposure amount selection signal 1302.

The selector 1305 selects the output of the first level conversion circuit 1303 if the exposure amount selection signal 1302 indicates the high-exposure image data. The selector 1305 selects the output of the second level conversion circuit 1304 if the exposure amount selection signal 1302 indicates the low-exposure image data.

FIGS. 11A and 11B show examples of the input/output characteristics applied by the first level conversion circuit 1303 and the second level conversion circuit 1304 when a high-exposure image is the correct exposure image. The horizontal axes indicate the input pixel value (12 bit), and the vertical axes indicate the output pixel value (12 bit).

As mentioned above, the difference input to the quantization circuit 1102 in the encoding circuit 40 is truncated by the number of bits indicated by the quantization parameter. For this reason, the pixel data decoded by the decoding circuit 60 has quantization noise equivalent to information of the lower bits truncated in the quantization circuit 1102.

If a high-exposure image is the correct exposure image, the smaller a pixel value of the high-exposure image is, the higher the combining ratio of the high-exposure image data is as shown in FIG. 7A, and thus, the larger the influence on the image quality of the combined image is. Therefore, if a high-exposure image is the correct exposure image, the quantization noise on the pixel data with relatively small values of the high-exposure image is reduced to improve the image quality of the combined HDR image.

More specifically, the slope of the input/output characteristics of the first level conversion circuit 1303 is made larger than 1 in the area with small pixel values, as shown in FIG. 11A. In this embodiment, input/output characteristics with a slope larger than 1 are used for the lowest approximately 18.75% ($3/16$) of pixel values (0 to 767) out of the possible range of the pixel values (0 to 4095).

On the other hand, if a high-exposure image is the correct exposure image, the larger a pixel value of the high-exposure image is, the lower the combining ratio of the high-exposure image data is as shown in FIG. 7A, and thus, the smaller the influence on the image quality of the combined image is. Therefore, if a high-exposure image is the correct exposure image, the code amount for the pixel data with relatively large values of the high-exposure image is reduced to improve encoding efficiency.

More specifically, the slope of the input/output characteristics of the first level conversion circuit 1303 is made smaller than 1 in a zone corresponding to the area with large pixel values, as shown in FIG. 11A. In this embodiment, input/output characteristics with a slope smaller than 0 are used in a zone corresponding to the highest 62.5% ($10/16$) of pixel values (536 to 4095) out of the possible range of the pixel values (0 to 4095).

The input/output characteristics shown in FIG. 11A have:
- a slope of 4 in the zone corresponding to pixel values (0 to 255) in a first range equivalent to the lowest 6.25% ($1/16$);
- a slope of 2 in the zone corresponding to pixel values (256 to 767) in a second range equivalent to the subsequent 12.5% ($2/16$);
- a slope of 1 in the zone corresponding to pixel values (768 to 1535) a third range equivalent to the subsequent 18.75% ($3/16$); and
- a slope of ½ in the zone corresponding to pixel values (1536 to 4095) in a fourth range equivalent to the last 62.5% ($10/16$).

Note that the number of divisions of the possible ranges of input pixel values, the size of each range, and the slopes assigned to the zones of the input/output characteristics corresponding to the respective ranges are examples and can be changed. However, the input/output characteristics are set so that the zone corresponding to the range of pixel values including the minimum pixel value has a slope larger than 1, and so that the slope does not decrease as the input pixel value increases.

If the input pixel value is 141, the first level conversion circuit 1303, which uses the input/output characteristics shown in FIG. 11A, multiplies this input pixel value by a fourfold slope and outputs a pixel value of 564. The level inversion circuit 70 applies the inverse characteristics of the input/output characteristics of the level conversion circuit 30 to the decoded pixel value. Accordingly, the encoded data with a pixel value of 564 is multiplied by ¼ after decoded. The quantization noise is also multiplied by 1/n as a result of multiplying the pixel value by n (n>1) before encoding and multiplying the pixel value by 1/n after decoding. Thus, the quality of the combined HDR image can be improved by converting the pixel level before encoding and after decoding.

If the input pixel value is 2838, the first level conversion circuit 1303 outputs a pixel value of 3467 (=(2838−1536)/2+2816) in accordance with the input/output characteristics in FIG. 11A. In the case where pixel level conversion is not performed, if the pixel value of the predicted pixel is 1536, the difference value between the input pixel and the predicted pixel is 2838−1536=1302, and the difference value "1302" is encoded. In contrast, in the case where pixel level conversion is performed as in this embodiment, the pixel value "1536" of the predicted pixel is also subjected to pixel level conversion into 2816 similarly to the input pixel. Thus, the difference value between the input pixel and the predicted pixel is 3467−2816=651, and the difference value "651" is encoded.

The encoding circuit 40 assigns a shorter code length the smaller the difference between the input pixel value and the predicted pixel value. For this reason, the code length of the difference value "651" in the case where pixel level conversion is performed is shorter than the code length of the difference value "1302" in the case where pixel level conversion is not performed. Thus, for input pixel values in the range where the slope of the input/output characteristics is smaller than 1, the code amount can be reduced by performing pixel level conversion.

Note that pixel values to which a slope smaller than 1 is applied in the level conversion circuit 30 are subjected to a slope larger than 1 in the level inversion circuit 70, thus magnifying the quantization noise after decoding. However, as a result of applying a slope smaller than 1 to pixel values with a small combining ratio in the level conversion circuit 30, the influence of the magnified quantization noise on the image quality of the combined HDR image is small. Accordingly, the effect of reducing the code amount is given priority.

Next, the input/output characteristics of the second level conversion circuit 1304 shown in FIG. 11B will be described. If a high-exposure image is the correct exposure image, the lamer a pixel value of a low-exposure image is, the higher the combining ratio of the low-exposure image data is as shown in FIG. 7B, and thus, the larger the influence on the image quality of the combined image is. Therefore, if a high-exposure image is the correct exposure image, the quantization noise on the pixel data with relatively large values of the low-exposure image is reduced to improve the image quality of the combined HDR image.

Accordingly, contrary to the input/output characteristics applied by the first level conversion circuit 1303, the input/output characteristics applied by the second level conversion circuit 1304 are made to have a slope larger than 1 in a zone corresponding to the range with large pixel values, as shown in FIG. 11B. In this embodiment, input/output characteristics with a slope larger than 1 are used in a zone corresponding to the highest 31.25% (⁵⁄₁₆) of pixel values (2816 to 4096) out of the possible range of the pixel values (0 to 4095).

Further, the code amount for pixel data with relatively small values of the low-exposure image that results in a smaller combining ratio is reduced to improve encoding efficiency. More specifically, the slope of the input/output characteristics of the second level conversion circuit 1304 is made smaller than 1 in a zone corresponding to the area with small pixel values, as shown in FIG. 11B. In this embodiment, input/output characteristics with a slope smaller than 1 are used in the zone corresponding to the range of the lowest 50% (⁸⁄₁₆) of pixel values (0 to 2047) out of the possible range of the pixel values (0 to 4095).

The input/output characteristics shown in FIG. 11B have:
a slope of ¼ in the zone corresponding to pixel values (0 to 1023) in a first range equivalent to the lowest 25% (⁴⁄₁₆);
a slope of ½ in the zone corresponding to pixel values (1024 to 2047) in a second range equivalent to the subsequent 25% (⁴⁄₁₆);
a slope of 1 in the zone corresponding to pixel values (2048 to 2815) in a third range equivalent to the subsequent 18.75% (³⁄₁₆); and
a slope of 2 in the zone corresponding to pixel values (2816 to 4095) in a fourth range equivalent to the last 31.25% (⁵⁄₁₆).

By applying such input/output characteristics, the second level conversion circuit 1304 reduces the quantization noise in the range of pixel values of the low-exposure image that have a significant influence on the image quality of the combined HDR image, thus improving the image quality of the HDR image. Meanwhile, the second level conversion circuit 1304 reduces the code amount in the range of pixel values that have a small influence on the image quality of the combined HDR image.

Figure 12A:
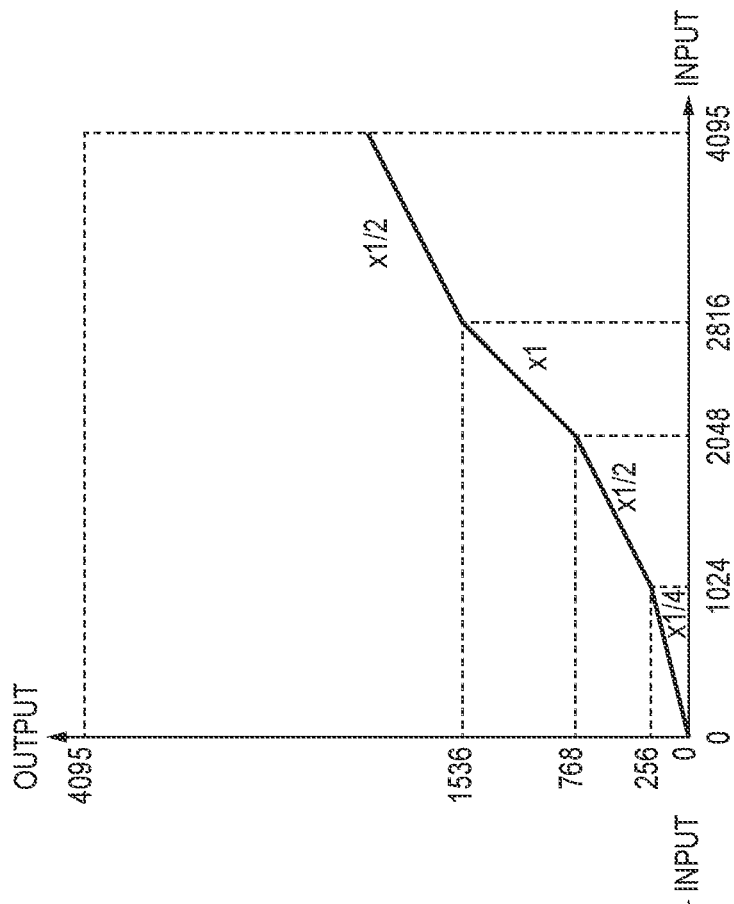
FIGS. 12A and 12B show examples of input/output characteristics of the level conversion circuit 30 according to the embodiment.
Figure 12B:
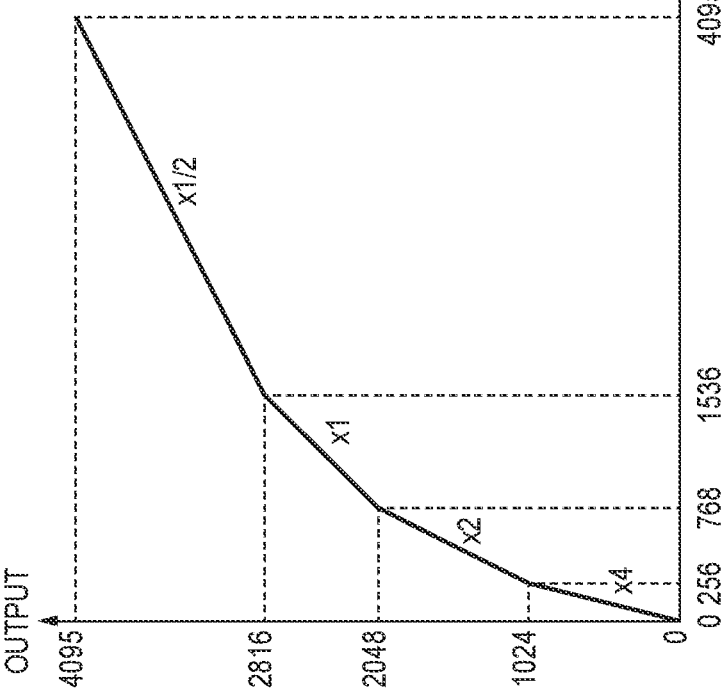

FIGS. 12A and 12B show examples of input/output characteristics applied by the first level conversion circuit 1303 and the second level conversion circuit 1304 in the case where a low-exposure image is the correct exposure image. The horizontal axes indicate the input pixel value (12 bit), and the vertical axes indicate the output pixel value (12 bit).

If a low-exposure image is the correct exposure image, the smaller a pixel value of a high-exposure image is, the higher the combining ratio of the high-exposure image data is as shown ire FIG. 7B, and thus, the larger the influence on the image quality of the combined image is. For this reason, if a low-exposure image is the correct exposure image, the quantization noise on pixel data with relatively small values of the high-exposure image is reduced to improve the image quality of the combined HDR image.

This is the same as in the case where a high-exposure image is the correct exposure image. Accordingly, in this embodiment, the first level conversion circuit 1303 applies the same input/output characteristics as in the case where a high-exposure image is the correct exposure image, as shown in FIG. 12A. However, the change in the combining ratio of a high-exposure image is different between when the correct exposure amount image is a high-exposure image and when the correct exposure image is a low-exposure image, as shown in FIGS. 7A and 7B. For this reason, the input/output characteristics applied by the first level conversion circuit 1303 may also be different between when the correct exposure image is a high-exposure image and when the correct exposure image is a low-exposure image.

For example, the input/output characteristics applied by the first level conversion circuit 1303 can be set so that the slope in the zone corresponding to the range of pixel values where the combining ratio of the high-exposure image is a predetermined value (e.g., 50% or a value exceeding 0.5) exceeds 1. Thus, different input/output characteristics are applied when the correct exposure image is a high-exposure image and when the correct exposure image is a low-exposure image, and the image quality of the combine HDR image can be improved.

In this manner, even when a low-exposure image is the correct exposure image, the first level conversion circuit 1303 performs level conversion on a high-exposure image using input/output characteristics having a slope larger than 1 in the zone corresponding to the range of pixel values for which the combining ratio is larger than or equal to a first predetermined value. The image quality of the combined HDR image can be thus improved. Further, the first level conversion circuit 1303 performs level conversion on a high-exposure image using input/output characteristics with a slope smaller than 1 in the zone corresponding to the range of pixel values for which the combining ratio is smaller than a second predetermined value. Thus, the code amount for pixel values that have a small influence on the image quality of the combined HDR image can be reduced.

Next, input/output characteristics applied to a low-exposure image in the second level conversion circuit 1304 will be described. A main purpose of shooting a low-exposure image with the correct exposure and combining it with a high-exposure image is to prevent blocked-up shadows from occurring in areas with small pixel values in the low-exposure image. In addition to the fact that blown-out white is less likely to occur in the low-exposure image, humans have the visual characteristic of being less likely to notice changes in bright areas. Accordingly, image quality degradation caused by quantization noise is less noticeable in areas with large pixel values. In light of the above, the range with large pixel values that results in a high combining ratio of a low-exposure image shot with the correct exposure does not necessarily have a significant influence on the image quality of the combined image.

For this reason, the second level conversion circuit 1304 of this embodiment uses input/output characteristics such as those shown in FIG. 12B. Specifically, the input/output characteristics have a slope of up to 1 that is smaller for smaller pixel values in the zone corresponding to the range of pixel values from the minimum value (0) to less than a predetermined value. Further, the input/output characteristics have a slope smaller than 1 in the zone corresponding to the range from a predetermined pixel value to the largest pixel value.

More specifically, the input/output characteristics shown in FIG. 12B have:

a slope of ¼ in the zone corresponding to pixel values (0 to 1023) in a first range equivalent to the lowest 25% (4/16);

a slope of ½ in the zone corresponding to pixel values (1024 to 2047) in a second range equivalent to the subsequent 25% (4/16);

a slope of 1 in the zone corresponding to pixel values (2048 to 2815) in a third range equivalent to the subsequent 18.75% (3/16); and a slope of ½ in the zone corresponding to pixel values (2816 to 4095) in a fourth range equivalent to the last 31.25% (5/16).

Thus, if a low-exposure image is the correct exposure image, the low-exposure image data is level-converted by applying the input/output characteristics with a slope smaller than 1 in zones corresponding to the range of pixel values with a low combining ratio and the range of pixel values with a high combining ratio. This makes it possible to reduce the code amount for both pixel values in dark areas where the combining ratio is low and the influence on the image quality of the combining image is small and pixel values in bright areas where the combining ratio is high but quantization noise is less noticeable.

Note that in the input/output characteristics shown in FIGS. 12A and 12B, the number of divisions of the possible range of input pixel values, the size of each range, and the slope assigned to each range are examples and can be changed. However, the input/output characteristics applied to a high-exposure image are set so as to have a slope larger than 1 in the zone corresponding to the range of pixel values that includes the minimum pixel value, and so that the slope does not decrease as the input pixel value increases. Further, the input/output characteristics applied to a low-exposure image are set so as to have a slope that does not exceed 1 in the zone corresponding to the range from the minimum pixel value to a predetermined pixel value, and so that the slope does not decrease as the input pixel value increases. In addition, a slope smaller than 1 is set for the zone corresponding to the range from a predetermined pixel value to the maximum pixel value. However, if image quality is given priority over the reduction in the code amount in the range from the predetermined pixel value to the maximum pixel value for which the combining ratio is high, a slope of 1 or more may be set for the zone of the input/output characteristics corresponding to this pixel value range.

Next, the operation of the level conversion circuit 30 will be described using the flowchart shown in FIG. 13. In this embodiment, the input/output characteristics used by the level conversion circuit 30 are divided into four zones. Therefore, the input pixel values corresponding to zone-dividing points and the corresponding output pixel values are defined as follows.

x_min: minimum value of input pixel
x_max: maximum value of input pixel
x_thn: input pixel value corresponding to a dividing point (n is an integer of 1 or more)

The output values corresponding to the respective items are denoted as y_min, y_max, y_thn.

For example, the input/output characteristics shown in FIG. 11A are as follows.

$$x\_min = 0$$
$$x\_max = 4095$$
$$x\_th1 = 256$$
$$x\_th2 = 768$$
$$x\_th3 = 1536$$
$$y\_min = 0$$
$$y\_max = 4095$$
$$y\_th1 = 1024$$
$$y\_th2 = 2048$$
$$y\_th3 = 2816$$

A zone corresponding to x_min≤x<x_th1 is denoted as a first zone, a zone corresponding to x_th1≤x<x_th2 as a second zone, a zone corresponding to x_th2≤x<x_th3 as a third zone, and a zone corresponding to x_th3≤x≤x_max as a fourth zone.

The slope in an mth zone of the input/output characteristics is denoted as αm (m is an integer between 1 and 4).

For example, the input/output characteristics shown in FIG. 11A are as follows.

$$\alpha 1 = 4$$
$$\alpha 2 = 2$$
$$\alpha 3 = 1$$
$$\alpha 4 = 1/2$$

Although the flowchart shown in FIG. 13 is executed by the level conversion circuit 30 in the following description, it is executed for each piece of input pixel data by the first level conversion circuit 1303 and the second level conversion circuit 1304.

In step S1601, the level conversion circuit 30 determines whether or not the value (pixel value) of input pixel data is smaller than x_th1. The level conversion circuit 30 executes step S1604 if it is determined that the pixel value is smaller than x_th1, and executes S1602 if not.

In step S1602, the level conversion circuit 30 determines whether or not the value (pixel value) of the input pixel data is smaller than x_th2. The level conversion circuit 30 executes step S1605 if it is determined that the pixel value is smaller than x_th2, and executes S1603 if not.

In step S1603, the level conversion circuit 30 determines whether or not the value (pixel value) of the input pixel data is smaller than x_th3. The level conversion circuit 30 executes step S1606 if it is determined that the pixel value is smaller than x_th3, and executes S1607 if not.

In step S1604, the level conversion circuit 30 sets parameters x_th, y_th, and α in an equation (described later) for calculating an output level y as follows.

$$x\_th = 0$$
$$y\_th = 0$$
$$\alpha = \alpha 1$$

Thereafter, the level conversion circuit 30 executes step S1608.

In step S1605, the level conversion circuit 30 sets the parameters as follows.

$$x\_th = x\_th1$$
$$y\_th = y\_th1$$
$$\alpha = \alpha 2$$

Thereafter, the level conversion circuit 30 executes step S1608.

In step S1606, the level conversion circuit 30 sets the parameters as follows.

$$x\_th = x\_th2$$
$$y\_th = y\_th2$$
$$\alpha = \alpha 3$$

Thereafter, the level conversion circuit 30 executes step S1608.

In step S1607, the level conversion circuit 30 sets the parameters as follows.

$$x\_th = x\_th3$$
$$y\_th = y\_th3$$
$$\alpha = \alpha 4$$

Thereafter, the level conversion circuit 30 executes step S1608.

In step S1608, the level conversion circuit 30 calculates the output value y for a pixel value x in accordance with the following equation (14).

$$y = (x - x\_th) \times \alpha + y\_th \tag{14}$$

The level conversion circuit 30 calculates the output value y and ends level conversion processing for the target pixel data.

Note that if high-exposure image data and low-exposure image data are read in parallel, the respective image data can be directly input to the first level conversion circuit 1303 and the second level conversion circuit 1304. In this case, the first level conversion circuit 1303 and the second level conversion circuit 1304 may execute the above-described level conversion operation in parallel. The level-converted pixel data may be output in parallel, or may be multiplexed by the selector 1305 and output as serial data.

Note that the output value y for the input pixel value x may alternately be obtained using a different method from the method illustrated in FIG. 13. For example, input/output characteristics may be implemented as a table, and the output value y may be obtained by referencing the table using the input pixel value x. If the input/output characteristics over the entire range of the input pixel value x can be expressed by a function of the input pixel value x, the output value y may be obtained by substituting the input pixel value x in the function.

Level Inversion Circuit 70

Figure 14:
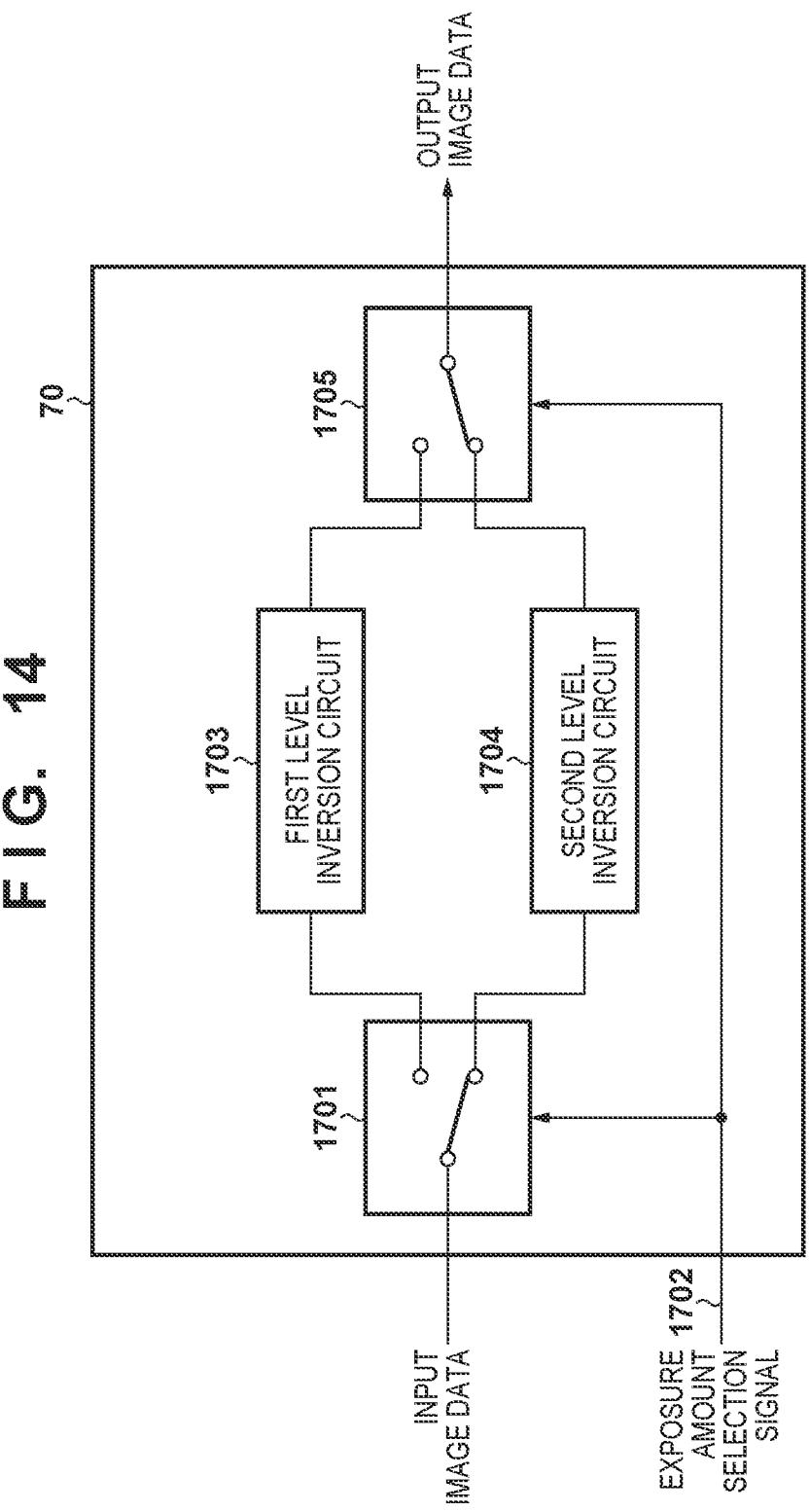
FIG. 14 is a block configuration diagram of a level inversion circuit 70 according to the embodiment.

FIG. 14 is a block diagram showing an example of a configuration of the level inversion circuit 70. The level inversion circuit 70 receives input of high-exposure image data and low-exposure image data that have been decoded by the decoding circuit 60 and then time-division multiplexed on a row-by-pixel basis, for example.

A selector 1701 selects whether to input the input image data to a first level inversion circuit 1703 or a second level inversion circuit 1704 based on an exposure amount selection signal 1702. Note that the selector 1701 is not necessary in a configuration in which the same data is processed by both the first level inversion circuit 1703 and the second level inversion circuit 1704.

The exposure amount selection signal 1702 is input from the decoding circuit 60 and indicates whether high-exposure image data or low-exposure image data is input.

If the exposure amount selection signal 1702 indicates high-exposure image data, the selector 1701 outputs the input image data to the first level inversion circuit 1703. If the exposure amount selection signal 1702 indicates low-exposure image data, the selector 1701 outputs the input image data to the second level inversion circuit 1704.

The first level inversion circuit 1703 and the second level inversion circuit 1704 convert the value of each piece of the pixel data that constitutes the input image data by applying the set input/output characteristics, and output the converted value. The input/output characteristics applied by the first level inversion circuit 1703 and the second level inversion circuit 1704 can be set and changed by the control circuit 120.

The first level inversion circuit 1703 applies the input/output characteristics for high-exposure image data, and the second level inversion circuit 1704 applies the input/output characteristics for low-exposure image data. Further, the input/output characteristics applied by the first level inversion circuit 1703 are inverse characteristics of the input/output characteristics applied by the first level conversion circuit 1303 before encoding. The input/output characteristics applied by the second level inversion circuit 1704 are inverse characteristics of the input/output characteristics applied by the second level conversion circuit 1304 before encoding. Here, certain input/output characteristics and their inverse characteristics have a relationship in which an output value is equal to an input value when both characteristics are applied to the input value.

A selector 1705 selects which of the output of the first level inversion circuit 1703 and the output of the second level inversion circuit 1704 is to be output to the combining circuit 80 in the later stage based on the exposure amount selection signal 1702.

The selector 1705 selects the output of the first level inversion circuit 1703 if the exposure amount selection signal 1702 indicates high-exposure image data. The selector 1705 selects the output of the second level inversion circuit 1704 if the exposure amount selection signal 1702 indicates low-exposure image data.

As described earlier, it is possible to achieve suppression of image quality degradation of the combined image caused by quantization noise and efficient encoding as a result of the level conversion circuit 30 and the level inversion circuit 70 using input/output characteristics with consideration given to the type of correct exposure image and the combining ratio.

Figure 15A:
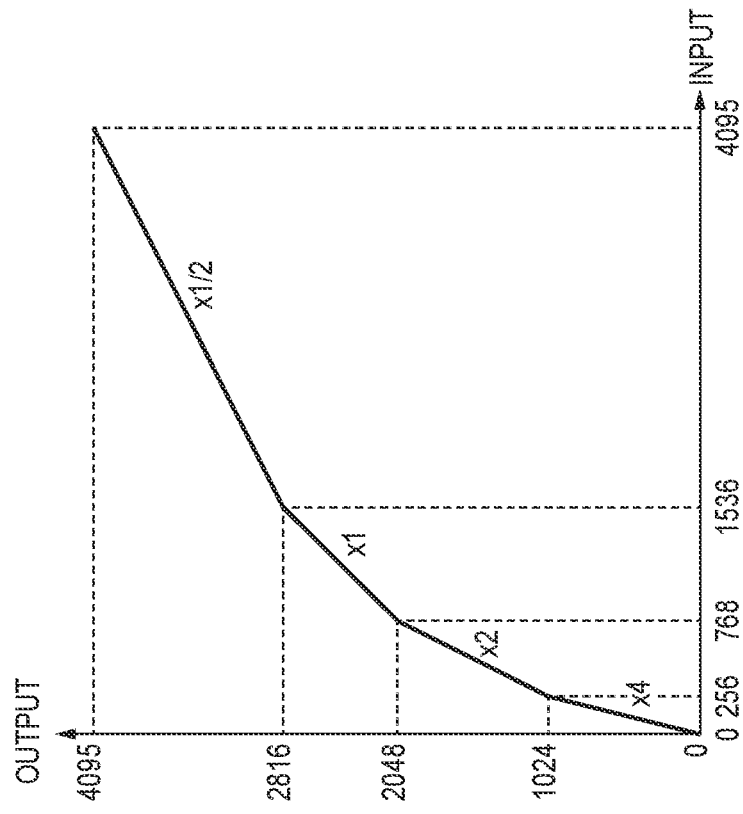
FIGS. 15A and 15B show examples of input/output characteristics of the level inversion circuit 70 according to the embodiment.
Figure 15B:
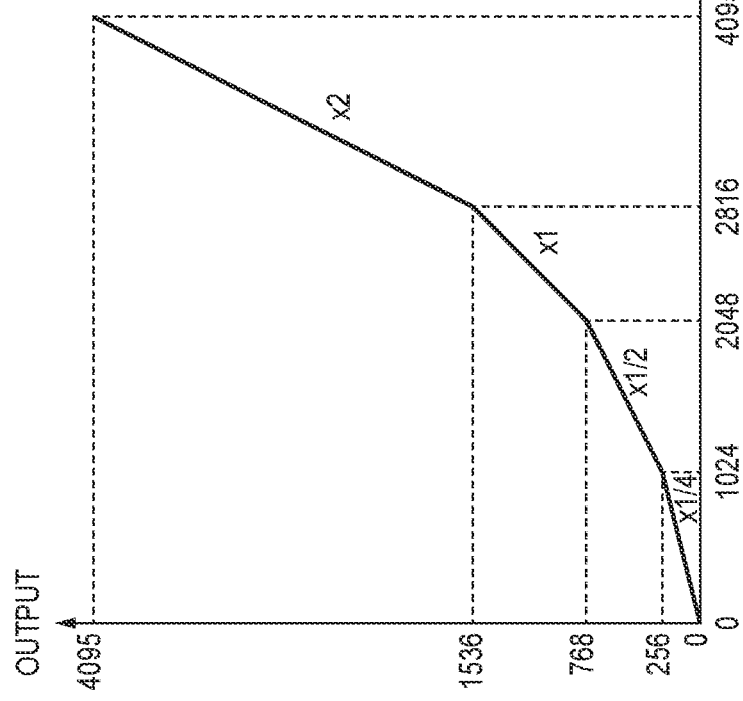

FIGS. 15A and 15B show examples of input/output characteristics applied by the first level inversion circuit 1703 and the second level inversion circuit 1704 in the case where a high-exposure image is the correct exposure image. The horizontal axes indicate the input pixel value (12 bit), and the vertical axes indicate the output pixel value (12 bit).

The input/output characteristics shown in FIG. 15A are input/output characteristics for converting pixel values converted based on the input/output characteristics shown in FIG. 11A into their original pixel levels. Accordingly, the input/output characteristics shown in FIG. 15A are equivalent to those obtained by replacing the input and output of the input/output characteristics shown in FIG. 11A with each other.

Similarly, the input/output characteristics shown in FIG. 15B are input/output characteristics for converting pixel values converted based on the input/output characteristics shown in FIG. 11B into their original pixel levels. Accordingly, the input/output characteristics shown in FIG. 15B are equivalent to those obtained by replacing the input and output of the input/output characteristics shown in FIG. 11B with each other.

The range of the pixel values of the decoded image data is restored to the range of the pixel values before decoding by the level inversion circuit 70. Accordingly, a combined image with proper brightness can be obtained by the combining circuit 80.

Note that if the decoding circuit 60 outputs a high-exposure image data and a low-exposure image data in parallel, the respective image data can be directly input to the first level inversion circuit 1703 and the second level inversion circuit 1704. In this case, the first level inversion circuit 1703 and the second level inversion circuit 1704 may execute level inversion in parallel. The level-inverted pixel data may be output in parallel, or may be multiplexed by the selector 1705 and output as serial data.

In this embodiment, the input/output characteristics applied by the level conversion circuit and the level inversion circuit are constituted by straight lines with different slopes. However, non-linear input/output characteristics with a slope that at least partially changes continuously may be used. For example, each set of the input/output characteristics shown in FIGS. 11A and 11B and FIGS. 12A and 12B may be input/output characteristics that are at least partially approximated by a curved line. In this case, the slope of the non-linear portion may be the slope of a tangent line.

According to this embodiment that provides a configuration in which a plurality of frames of image data output from the image sensor through a single shooting are combined to generate a combined image, the image data is transmitted after reducing the amount of image data by encoding it. As a result, the bandwidth of the transmission path can be effectively used. In addition, the image quality degradation of the combined image caused by encoding can be suppressed by level-converting and inverting pixel values using appropriate input/output characteristics before encoding and after decoding. Further, level-conversion of pixel values with appropriate input/output characteristics makes it possible to realize the reduction in the code amount using human visual characteristics in addition to the reduction in the data amount through encoding. The input/output characteristics applied to image data are set based on the size of contribution (combining ratio) to a combined image.

Second Embodiment

Next, the second embodiment of the present invention will be described. In the first embodiment, a plurality of frames of images with overlapping exposure periods and different exposure amounts are obtained through a single shooting using an image sensor capable of controlling the exposure time for each pixel.

The second embodiment will describe a configuration in which a plurality of frames of images with overlapping exposure periods and different exposure amounts are obtained through a single shooting by controlling the gain of an amplifier circuit provided for each column of the image sensor in the column amplifier circuit 203. Specifically, image data equivalent to image data with different exposure amounts is obtained by applying different gains to the same image data.

This embodiment does not need a configuration for controlling the exposure time for each pixel as the first embodiment does. That is, one type of control signal for controlling the transfer switch 215 in each unit pixel 201 is used per pixel row, and an image sensor with color filters of different colors provided to adjacent pixels can be used. Read pixel signals need not be added either.

This embodiment can be realized with the same configuration as the first embodiment except for the configuration for obtaining a plurality of frames of images with overlapping exposure periods and different exposure amounts through a single shooting. Therefore, the following description will focus on a configuration and operation of the column amplifier circuit 203 of this embodiment, and omits the description of the same content as the first embodiment.

Figure 16:
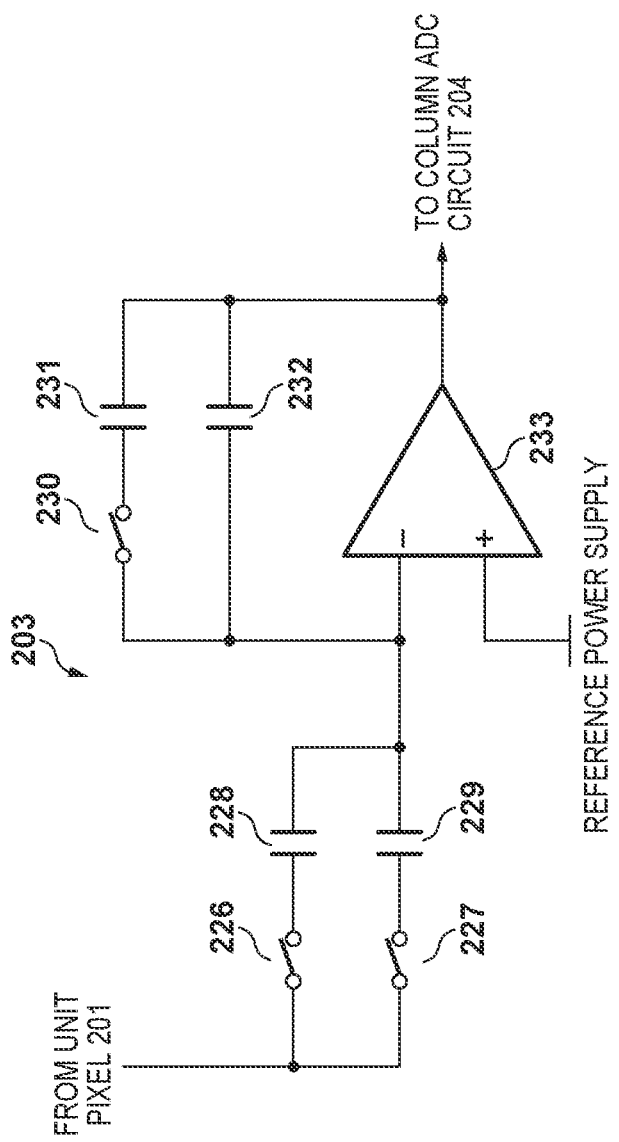
FIG. 16 is a circuit diagram showing an example of a configuration of a column amplifier in a column amplifier circuit 203 according to a second embodiment.

FIG. 16 shows an example of a circuit configuration of one of the column amplifiers in the column amplifier circuit 203 of this embodiment.

The column amplifier is an inverting amplifier circuit that is constituted by an operational amplifier 233, input-side capacitors 228 and 229, and feedback capacitors 231 and 232. A predetermined reference voltage is input from a reference power supply to a positive input terminal (non-inverting input terminal) of the operational amplifier 233. The timing control circuit 208 is capable of switching between connecting and not connecting the input-side capacitors 228 and 229 to the feedback capacitor 231 by supplying a control signal to control operation of switches 226, 227, and 230.

The feedback capacitors 231 and 232 are connected in parallel to an inverting input terminal and an output terminal of the operational amplifier 233. The switch 230 is connected between the feedback capacitor 231 and the inverting input terminal of the operational amplifier 233 and switches between connecting and not connecting the feedback capacitor 231. Accordingly, the feedback capacitance of the operational amplifier 233 can be changed (switched) by the switch 230.

The input-side capacitors 228 and 229 are connected in parallel between the vertical signal line 220 and the inverting input terminal of the operational amplifier 233. The switches 226 and 227 are connected between the column signal line 220 and the input-side capacitors 228 and 229, respectively. The switches 226 and 227 switch between connecting and not connecting the input-side capacitors 228 and 229 to the inverting input terminal of the operational amplifier 233. Accordingly, the capacitance on the input side of the operational amplifier 233 can be changed (switched) by the switches 226 and 227.

The amplification factor of the operational amplifier 233 is determined by "input-side capacitance/feedback capacitance". Accordingly, the amplification factor, i.e., the gain of the operational amplifier 233 can be changed (switched) by controlling the switches 226, 227, and 230.

Specifically, when the switch 226 is ON and the switches 227 and 230 are OFF, the operational amplifier 233 has a gain (first gain) that is determined by the capacitance ratio between the input-side capacitor 228 and the feedback capacitor 232. When the switch 226 is OFF and the switches 227 and 230 are ON, the operational amplifier 233 has a gain (second gain) that is determined by the ratio between the capacitance of the input-side capacitor 229 and the combined capacitance of the feedback capacitors 231 and 232. Accordingly, low-exposure image data and high-exposure image data can be generated from one frame of image data by controlling the switches 226, 227, and 230.

The low-exposure image data or the high-exposure image data is output from the column amplifier circuit 203 to the column ADC circuit 204 in accordance with the state of the switches 226, 227, and 230. The subsequent operation is the same as the first embodiment, and the description will be omitted accordingly.

This embodiment can also realize the same effects as the first embodiment. Furthermore, this embodiment can further reduce the cost of the imaging circuit than the first embodiment since an imaging circuit with a general configuration can be used.

Third Embodiment

Next, the third embodiment of the present invention will be described. This embodiment will describe the case of obtaining high-exposure image data and low-exposure image data by performing shooting multiple times with different exposure amounts.

Figure 17:
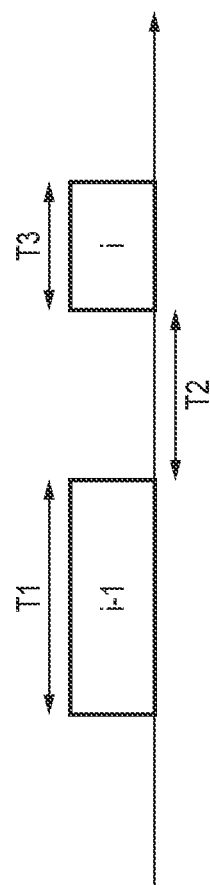
FIG. 17 shows an example of operation timing of the imaging circuit 20 according to a third embodiment.

FIG. 17 shows an example of operation timing of the imaging circuit 20 in the case of performing shooting multiple times with different exposure amounts. In FIG. 17, an i−1th image is shot with an exposure time T1 corresponding to the correct exposure by the imaging circuit 20. An ith image is shot with a shorter exposure time T3 than that of the i−1th image after a fixed time T2 has passed since the shooting of the i−1th image. The i−1th image is a high-exposure image and a correct exposure image with a relatively longer exposure time than that of the ith image, and the ith image is a low-exposure image. Note that the operation timing and the exposure time of the imaging circuit 20 shown in FIG. 17 can be changed by the control circuit 120 controlling the operation of the timing control circuit 208 in the imaging circuit 20.

In this case, high-exposure image data and low-exposure image data are sequentially output from the imaging circuit 20 to the level conversion circuit 30. The subsequent operation is the same as the first embodiment, and the description will be omitted accordingly.

In this embodiment, the imaging circuit 20 outputs one frame of image data to the level conversion circuit 30 in a single shooting. Therefore, the bandwidth usage of the transmission path is smaller than in the first and second embodiments. However, the bandwidth usage of the transmission path can be further reduced while suppressing image quality deterioration due to encoding by applying the same level conversion and encoding as in the first embodiment.

Other Embodiments

The above embodiments have described configurations in which images are combined during shooting. However, the present invention is also applicable to a configuration in which images are combined using image data that is prepared in advance. In this case, it is possible to reduce the bandwidth usage between a storage device or a memory in which the image data is stored and a combining processing circuit.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-016889, filed on Feb. 4, 2021, which is hereby incorporated by reference herein in its entirety.

What is claimed is:

1. An image processing apparatus comprising:
an obtaining circuit that obtains a plurality of pieces of image data with different exposure amounts;
a conversion circuit that performs a level-conversion of the plurality of pieces of image data by applying input/output characteristics to the plurality of pieces of image data;
an encoding circuit that applies encoding to reduce a data amount of the plurality of pieces of image data that has been performed the level-conversion;

a decoding circuit that decodes the plurality of pieces of image data that has been encoded;
an inversion circuit that applies inverse characteristics of the input/output characteristics to the plurality of pieces of image data that have been decoded; and
a combining circuit that generates combined image data from the plurality of pieces of image data output by the inversion circuit,
wherein the input/output characteristics are set in accordance with a combining ratio of each of the plurality of pieces of image data in the combining circuit.

2. The image processing apparatus according to claim 1, wherein the encoding is lossy encoding, and
the input/output characteristics are set in accordance with the combining ratio so as to reduce image quality degradation caused by the encoding.

3. The image processing apparatus according to claim 2, wherein the input/output characteristics are set so as to reduce image quality degradation associated with a pixel value with the combining ratio that is larger than a specific value.

4. The image processing apparatus according to claim 2, wherein the input/output characteristics are set such that image quality degradation is not reduced for a pixel value with the combining ratio that is larger than a specific value, the pixel value being larger than a predetermined value.

5. The image processing apparatus according to claim 1, wherein the input/output characteristics have at least one of a zone having a slope larger than 1 and a zone having a slope smaller than 1.

6. The image processing apparatus according to claim 5, wherein the zone having a slope larger than 1 corresponds to a range of a pixel value with the combining ratio that is larger than a predetermined value.

7. The image processing apparatus according to claim 5, wherein the zone having a slope smaller than 1 corresponds to a range of a pixel value with the combining ratio that is smaller than a predetermined value.

8. The image processing apparatus according to claim 1, wherein the plurality of pieces of image data include first image data with a correct exposure amount and second image data with a lower exposure amount than the correct exposure amount,
the combining circuit combines the first image data with the second image data using a combining ratio corresponding to a pixel value, and
the input/output characteristics applied to the first image data have a slope larger than 1 in a zone from a smallest pixel value to a first pixel value, and have a slope smaller than 1 in a zone from a second pixel value that is larger than the first pixel value to a largest pixel value.

9. The image processing apparatus according to claim 1, wherein the plurality of pieces of image data include first image data with a correct exposure amount and second image data with a lower exposure amount than the correct exposure amount,
the combining circuit combines the first image data with the second image data using a combining ratio corresponding to a pixel value, and
the input/output characteristics applied to the second image data have a slope smaller than 1 in a zone from a smallest pixel value to a third pixel value, and have a slope larger than 1 in a zone from a fourth pixel value that is larger than the third pixel value to a largest pixel value.

10. The image processing apparatus according to claim 1, wherein the plurality of pieces of image data include first image data with a correct exposure amount and second image data with a higher exposure amount than the correct exposure amount,
the combining circuit combines the first image data with the second image data using a combining ratio corresponding to a pixel value, and
the input/output characteristics applied to the second image data have a slope smaller than 1 in a zone from a smallest pixel value to a fifth pixel value and a zone from a sixth pixel value that is larger than the fifth pixel value to a largest pixel value.

11. The image processing apparatus according to claim 1, wherein the plurality of pieces of image data include first image data with a correct exposure amount and second image data with a higher exposure amount than the correct exposure amount,
the combining circuit combines the first image data with the second image data using a combining ratio corresponding to a pixel value, and
the input/output characteristics applied to the first image data have a slope larger than 1 in a zone from a smallest pixel value to a seventh pixel value, and have a slope smaller than 1 in a zone from an eighth pixel value that is larger than the seventh pixel value to a largest pixel value.

12. The image processing apparatus according to claim 1, wherein the obtaining circuit obtains the plurality of pieces of image data through a single shooting using an image sensor capable of controlling an exposure time on a pixel-by-pixel basis.

13. The image processing apparatus according to claim 1, wherein the obtaining circuit obtains the plurality of pieces of image data by applying different gains to image data obtained through a single shooting.

14. The image processing apparatus according to claim 1, wherein the obtaining circuit obtains the plurality of pieces of image data by performing shooting multiple times with different exposure amounts.

15. An image capture apparatus comprising:
an image processing apparatus that comprises:
an obtaining circuit that obtains a plurality of pieces of image data with different exposure amounts;
a conversion circuit that performs a level-conversion of the plurality of pieces of image data by applying input/output characteristics to the plurality of pieces of image data;
an encoding circuit that applies encoding to reduce a data amount of the plurality of pieces of image data that has been performed the level-conversion;
a decoding circuit that decodes the plurality of pieces of image data that has been encoded;
an inversion circuit that applies inverse characteristics of the input/output characteristics to the plurality of pieces of image data that have been decoded; and
a combining circuit that generates combined image data from the plurality of pieces of image data output by the inversion circuit,
wherein the input/output characteristics are set in accordance with a combining ratio of each of the plurality of pieces of image data in the combining circuit; and
an imaging circuit that outputs the plurality of pieces of image data.

16. An image processing method comprising:
obtaining a plurality of pieces of image data with different exposure amounts;
performing a level-conversion of the plurality of pieces of image data by applying input/output characteristics to the plurality of pieces of image data;
applying encoding to reduce a data amount of the plurality of pieces of image data that has been performed the level-converted;
decoding the plurality of pieces of image data that has been encoded;
applying inverse characteristics of the input/output characteristics to the plurality of pieces of image data that has been decoded; and
generating combined image data from the plurality of pieces of image data to which the inverse characteristics have been applied,
wherein the input/output characteristics are set in accordance with a combining ratio of the plurality of pieces of image data in the combining.

17. A non-transitory computer-readable storage medium storing a program for causing a computer to function as an image processing apparatus comprising:
an obtaining unit configured to obtain a plurality of pieces of image data with different exposure amounts;
a conversion unit configured to perform a level-conversion of the plurality of pieces of image data by applying input/output characteristics the plurality of pieces of image data;
an encoding unit configured to apply encoding to reduce a data amount of the plurality of pieces of image data that has been performed the level-conversion;
a decoding unit configured to decode the plurality of pieces of image data that has been encoded;
an inversion unit configured to apply inverse characteristics of the input/output characteristics to the plurality of pieces of image data that has been decoded; and
a combining unit configured to generate combined image data from the plurality of pieces of image data output by the inversion unit,
wherein the input/output characteristics are set in accordance with a combining ratio of each of the plurality of pieces of image data in the combining unit.

* * * * *